US009665955B1

(12) United States Patent
Meyer et al.

(10) Patent No.: US 9,665,955 B1
(45) Date of Patent: May 30, 2017

(54) POSE-SPACE SHAPE FITTING

(71) Applicant: Pixar, Emeryville, CA (US)

(72) Inventors: Mark Meyer, San Francisco, CA (US); Forrester Cole, Emeryville, CA (US)

(73) Assignee: Pixar, Emeryville, CA (US)

( * ) Notice: Subject to any disclaimer, the term of this patent is extended or adjusted under 35 U.S.C. 154(b) by 340 days.

(21) Appl. No.: 14/503,241

(22) Filed: Sep. 30, 2014

(51) Int. Cl.
*G06T 11/20* (2006.01)
*G06T 13/20* (2011.01)

(52) U.S. Cl.
CPC .............. *G06T 11/20* (2013.01); *G06T 13/20* (2013.01)

(58) Field of Classification Search
CPC ...................................... G06T 11/20
USPC .................................. 345/441, 473
See application file for complete search history.

(56) References Cited

U.S. PATENT DOCUMENTS

| 8,054,311 | B1* | 11/2011 | Sheffler | G06T 13/40 345/419 |
| 2007/0031003 | A1* | 2/2007 | Cremers | G06K 9/6207 382/103 |
| 2010/0277752 | A1* | 11/2010 | Tin | H04N 1/6058 358/1.9 |
| 2012/0169737 | A1* | 7/2012 | Alter | G06T 13/40 345/428 |

OTHER PUBLICATIONS

Bengio, J. C., and R. Goldenthal, "Simplicial interpolation for animating the hulk", In ACM SIGGRAPH 2013 Talks, ACM, New York, NY, USA, SIGGRAPH 2013, 7:1-7:1.
Seol, Y. et al., "Weighted pose space editing for facial animation", The Visual Computer 28, 3, pps. 319-327.

\* cited by examiner

*Primary Examiner* — Jacinta M Crawford
*Assistant Examiner* — Terrell Robinson
(74) *Attorney, Agent, or Firm* — Kilpatrick Townsend & Stockton LLP

(57) ABSTRACT

Techniques relate to fitting a shape of an object when placed in a desired pose. For example, a plurality of training poses can be received, wherein each training pose is associated with a training shape. The training poses can be clustered in pose space, and a bid point can be determined for each cluster. A cluster-fitted shape can then be determined for a pose at the bid point using the training shapes in the cluster. A weight for each cluster-fitted shape can then be determined. The cluster-fitted shapes can then be combined using the determined weights to determine a shape of the object in the desired pose.

20 Claims, 16 Drawing Sheets

POSE-SPACE SHAPE FITTING

The present invention relates generally to computer animation and graphics, and more particularly to techniques for efficient fitting of the shape of an object in a pose.

BACKGROUND

The deformation of objects such as characters is a common technique in computer animation. A popular method for assisting in the deformation of objects is to define a rig (e.g., a skeleton) for an object and a surface representation of the object that follows the motion of the rig. An animator can then control the rig, such as through the use of animation variables, to set a pose of the object. The pose can be used to determine the shape of the object.

However, in some cases, the shape of an object at a pose may be undesirable. For example, the resulting shape may be unappealing, unrealistic, or produce visual artifacts. To correct this, a user (e.g., an animator or rigger) may define a new shape at the pose. For example, the user might place the object into the pose, then manually alter the surface representation of the object to achieve a desired shape. This process can be repeated to determine a plurality of training poses, each associated with a shape indicated by the user. The shape of the object at intermediate poses can be interpolated from these training poses.

However, determining an effective interpolation algorithm may be challenging, especially for objects with production-level complexity. For example, such objects may have hundreds or thousands of animation variables that influence the shape of the object. For such objects, the number of training poses may bound only a tiny subset of the pose space. Further, in some cases, dozens or more of the animation variables may influence a single vertex of the object. Thus, it may be computationally prohibitive to use current techniques while providing precision in such circumstances.

Therefore, it is desirable to provide a method and system for the interpolation of shapes in an efficient manner.

BRIEF SUMMARY

Embodiments of the invention relate to fitting a shape of an object when placed in a desired pose. For example, a plurality of training poses can be determined, wherein each training pose is associated with a training shape. The training poses can be clustered in pose space, and a bid point can be determined for each cluster. The bid point may indicate a projection of the desired pose into a convex set for the cluster. A cluster-fitted shape can then be determined for a pose at the bid point using the training shapes in the cluster. A weight for each cluster-fitted shape can then be determined. The weight of a cluster may depend on a corresponding coefficient in a linear combination of basis vectors from the origin of the pose space to the bid points that results in the desired pose. For example, the weight may be a coefficient corresponding to the $L_1$ minimization of the linear combination. The cluster-fitted shapes can then be combined using the determined weights to determine a shape of the object in the desired pose.

Other embodiments disclose systems comprising processors and memory configured to implement methods of fitting shapes. Other embodiments disclose a computer product comprising a non-transitory computer-readable medium storing code that causes one or more processors of a computer to implement methods of fitting shapes.

DEFINITIONS

Figure 1:
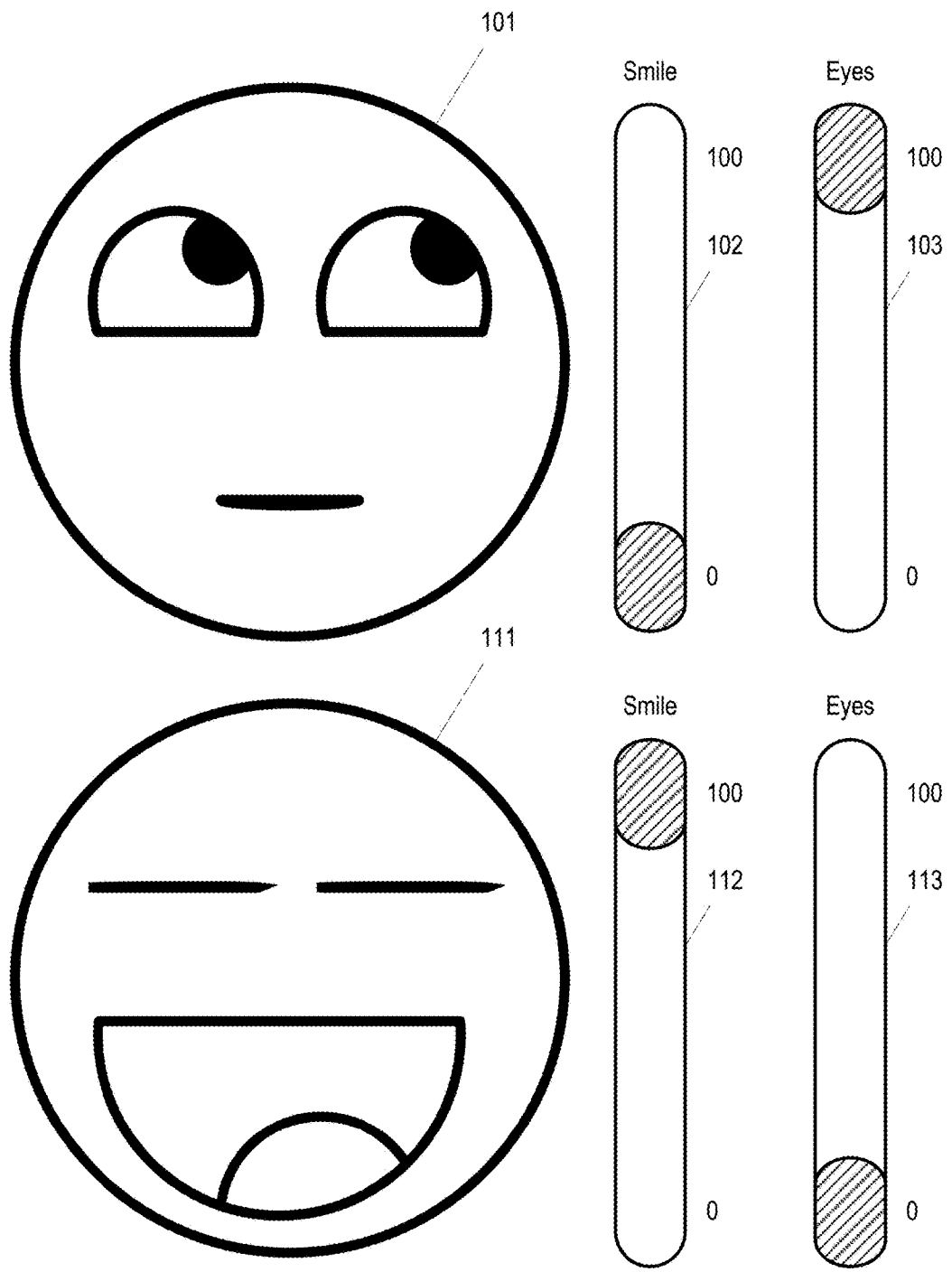
FIG. 1 shows a first shape of an object when placed in a first pose, and a second shape of the object when placed in a second pose.

An "object" may include any suitable computer representation of part or all of an entity, such as a character, a landscape, an inanimate object, or any other virtual entity. Objects may be constructed, for example, out of geometrical vertices, edges, and faces in a 2D or 3D coordinate system.

A "shape" of an object may include the positions and/or orientations of geometrical entities comprising the object. For example, the shape of an object may indicate the coordinates of each vertex of the object in a two or three dimensional space. In some cases, an object may be represented using a surface mesh that can be deformed using a animation variables defined by a user. For example, for an object representing a character's face, a first animation variable may represent the expression of the character's mouth, and a second animation variable may represent the character's eyes. An animator may alter the animation variables to cause the shape of the face to deform, resulting in various expressions.

A "pose" may include any combination or set of inputs that are used to determine the shape of an object. For example, a pose may be defined by a value for each of a plurality of animation variables. Alternatively, a pose may be defined by deformation matrix, by a deformation function (e.g., whereby the position of a vertex is an input to the function, and a resulting new position is an output), or any other suitable method. A "pose space" may include a mathematical space comprising the set of all possible poses. For example, if an object has N animation variables to control the pose of the object, and each animation variable can take any real value, then the pose space may be expressed as $\mathbb{R}^N$.

A "training pose" may include a pose whereby a shape at that pose is indicated to be acceptable. The shape at that pose may be referred to as a "training shape." For example, a rigger, animator, or other user may move an object to a desired pose, alter the shape of the object at the pose, and indicate (e.g., to modeling software) that the altered object is desirable. Thus, for the training pose, a corresponding training shape is known to be acceptable to the user.

A "cluster" may include any combination of training poses whereby similar poses are grouped together. For example, clusters may be axis-aligned, so that training poses that share the same sign for each animation variable can be grouped together. In some cases, a cluster may be associated with a range of values for each of a plurality of dimensions (e.g., animation variables) in a pose space, such as a convex hull.

A "convex hull" of a cluster corresponds to a convex space that includes the training poses of a cluster. The space is convex in that a line between any two training poses of the cluster stays within the convex space. The boundaries of the convex space can be defined by one or more training poses of a cluster. For example, for a cluster that is two dimensional, the convex hull of the cluster may be visualized as the area of a polygon that encompasses the training poses of the cluster.

A "bid point" may include any coordinate within a cluster in pose space that is considered most similar to a desired pose. Similarity between poses may be determined in any suitable manner. For example, a distance metric, a projection method, or any other suitable algorithm may be used to determine similarity.

A "fitting" process may include a method for determining a shape of an object at a pose. For example, in cases where the pose is between two or more training poses, fitting may involve interpolating the shape of the object. In other cases where the pose is outside the range of training poses, fitting may involve extrapolating the shape of the object.

A "cluster-fitted shape" may include any shape of an object that is fitted for a pose corresponding to the bid point of a cluster. For example, if the bid point of a cluster is a convex combination of the poses in the cluster, the cluster-fitted shape may be a weighted average of the shapes associated with the poses in the cluster, where the weights correspond to the coefficients in the convex combination.

DETAILED DESCRIPTION

Embodiments of the invention relate to fitting a shape of an object when placed in a desired pose. For example, in order to fit the shape in the desired pose, embodiments may first receive and cluster a plurality of training poses, each training pose associated with a training shape. The desired pose can then be projected onto a convex set associated with each cluster to determine a bid point for each cluster. A cluster-fitted shape for the bid point of each cluster can be determined. The cluster-fitted shapes can then be combined to determine a shape of the object in the desired pose.

Some embodiments can allow a rigger, animator, or other user to define a plurality of training poses and desirable training shapes associated with the training poses. Although deformation of an object can be calculated procedurally from the value of an animation variable, in some cases the resulting object may have an undesirable shape. For example, an animation variable may control the angle of a character' elbow in an object representing the character's arm. However, the shape of the character's arm may intersect with itself, deform in an unexpected manner, or otherwise appear awkward at highly acute angles (i.e., when the arm is bent). To address this, embodiments can allow a user to modify the shape of the arm at a pose (e.g., wherein the arm is bent) to a desired shape. For example, the user may modify vertices within the arm to be coplanar close to the elbow, add a bulge in the arm representing movement of the biceps, etc. Once the arm has a desired shape, the pose can be identified as a training pose. The shape of an object at another pose can accordingly be fitted from training shapes defined by the user.

Some embodiments can also effectively fit the shape of highly complex objects. In some cases, production-level objects (e.g., those used in animated feature films) may have hundreds or thousands of animation variables that influence the shape of an object. Further, a single vertex in the object may be influenced by dozens of the animation variables. The "curse of dimensionality" becomes apparent for such objects—it is clearly infeasible for a user to define training shapes that span a significant subset of the pose space of such an object. Thus, fitting methods that rely solely on distance from a desired pose may be ineffective in determining a suitable shape of the object. By first clustering training poses, determining a cluster-fitted shape for each training pose, and then determining a shape for a desired pose from the cluster-fitted shapes, embodiments can provide an effective fitted shape even when the number of training poses is limited relative to the pose space.

Embodiments may use observations about the common corrective-shape rigging conventions. One observation is that corrective shapes tend to depend on a few controls. While the overall number of shapes and animation controls may be very large, the individual shape weights tend to be defined by only a few controls, often times just one. Each shape therefore has a large null space in which motion should not affect the shape weight; e.g., when the toe moves, the weights defining the finger deformation shouldn't change. In other words, instead of expecting each vertex to depend on a few controls, each shape weight can be expected to depend on a few controls.

A second observation is that most of the pose space is empty. The size of pose space grows exponentially with the number of animation controls, meaning that for any realistic number of controls, a very small fraction of pose space will contain data. Further, because of the high-dimensionality of the space, it is very unlikely that any new pose will be "surrounded" by the training poses, meaning that the fitting function will almost always be extrapolating from, rather than interpolating inside, the data. Radial-basis function (RBF)-based fitting functions tend to perform very poorly under extrapolation, so embodiments can provide a different approach in these cases.

A third observation is that piecewise linear fitting produces intuitive, predictable shape deformations. The price of linear fitting is lack of $C_1$ continuity, but animators may generally prefer this tradeoff Sparse shape weights may be preferable for linear fitting. Simplicial interpolation, for example, produces sparse weights: there are never more than N+1 nonzero weights for pose space of dimension N. Embodiments of the invention can maintain sparse weights in a manner less restrictive than such approaches.

The above examples highlight only a few of the advantages of shape fitting in accordance with embodiments of the invention.

I. Introduction

Pose-space deformation (PSD) methods based on scattered-data fitting can be powerful tools for sculpting. An important advantage is that they allow the sculptor to simply pose the character in an interesting position, then modify the shape until it is satisfactory. The input to a pose-space deformation system is generally a set of training shapes, each with a position in pose space (i.e., a training pose). The job of the PSD system is to compute blending weights for each of the training shapes given a new position in pose space. If an appropriate fitting function is used, the shape will vary smoothly and intuitively as the pose moves between training poses (interpolation), and also as the pose moves away from all from the training poses (extrapolation). Fitting can involve interpolation, extrapolation, regression, and the like.

FIG. 1 shows a first shape 101 of an object when placed in a first pose, and a second shape 111 of the object when placed in a second pose. As shown in FIG. 1, the object is a character's face. The first pose may be defined by two animation variables: a first variable controlling the smile of the face, and a second variable controlling the eyes of the face. Each of the animation variables may take a value between 0 and 100. For example, in some embodiments, the animation variables may be controlled using sliders (e.g., smile animation variable sliders 102 and 112, and eyes animation variable sliders 103 and 113).

Face 101 illustrates the shape of the object when the smile animation variable is set to 0 (as shown in smile animation variable slider 102), and the eyes animation variable is set to 100 (as shown in eyes animation variable slider 103). Accordingly, as shown in face 101, the character's eyes are open and mouth is closed.

Face 111 illustrates the shape of the object when the smile animation variable is set to 100 (as shown in smile animation variable slider 112), and the eyes animation variable is set to 0 (as shown in eyes animation variable slider 113). Accordingly, as shown in face 111, the character's eyes are closed and mouth is open.

In one embodiment, the poses defined by the animation variables may be training poses with the corresponding training shapes 101 and 111. Subsequently, a user may define a new pose for the object shown in FIG. 2.

Figure 2:
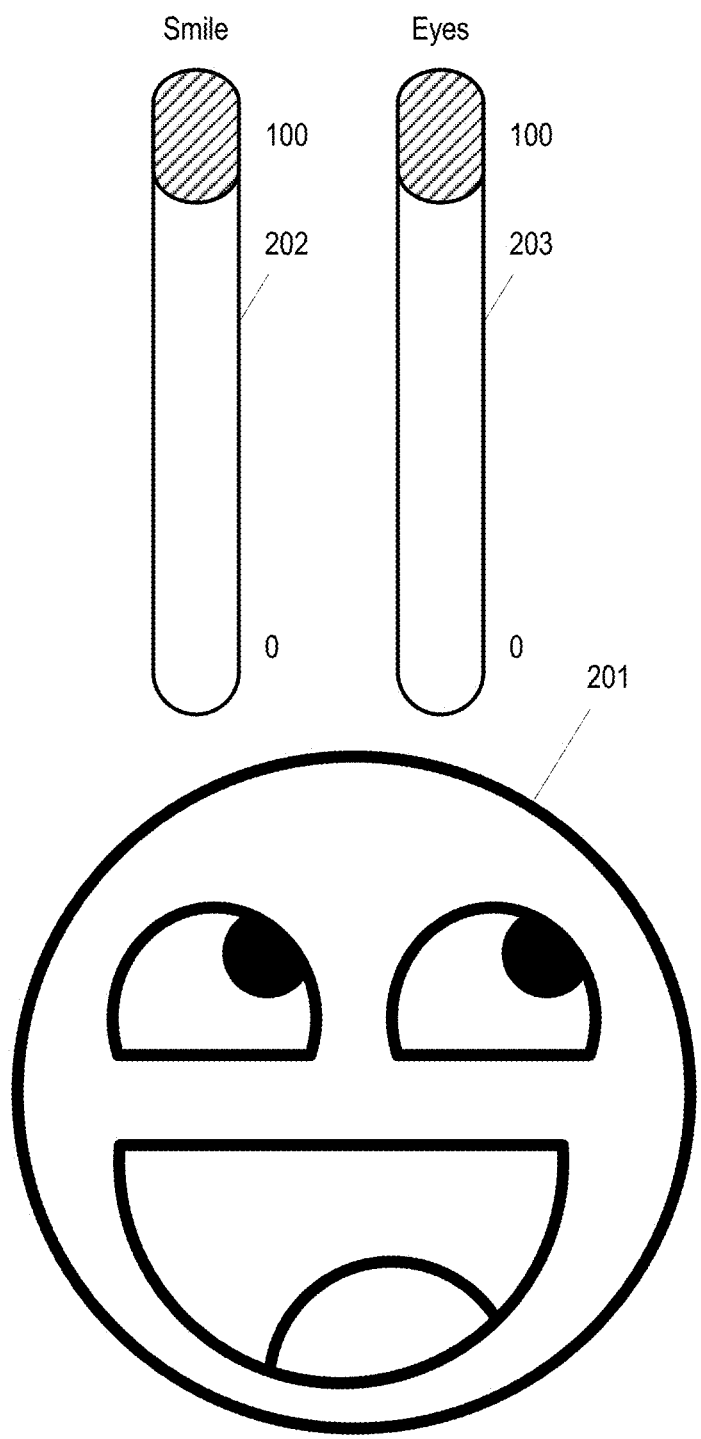
FIG. 2 shows a fitted shape of an object when placed in a pose.

FIG. 2 shows a shape 201 of an object that is fitted from shapes 101 and 111 shown in FIG. 1. As shown in FIG. 2, a user defines a pose for an object wherein the smile animation variable is set to 100 (as shown in smile animation variable slider 202), and the eyes animation variable is also set to 100 (as shown in eyes animation variable slider 203). Since a training pose has not been previously defined for this set of animation variable values, a shape corresponding to the pose will need to be fitted from the training poses.

Face 201 shows an example of a fitted shape. As would be expected, face 201 has open eyes (similar to face 101), and an open mouth (similar to face 111). Typically, face 201 would be determined using a fitting function that uses the user-defined training poses, such as those shown in FIG. 1.

In some cases, a fitting function can be constructed as a sum of radial-basis functions (RBFs) centered at each training pose. The RBFs can be fit such that the fitting function reconstructs each training shape exactly and varies smoothly elsewhere in pose space. Radial-basis functions have a number of strong points: they are easy to understand, relatively straightforward to construct, and fast to evaluate.

However, RBF-based fitting functions also have important drawbacks. Their behavior away from the training poses is not always intuitive, especially when extrapolating outside the training data, and while the behavior may always be improved by adding more training data, the required amount of training data grows exponentially with the number of pose-space dimensions.

The pose space of a production animated character may have over one thousand dimensions, much more than is practical for RBF-based fitting. In practice, the pose space is usually divided into separate domains (e.g., two neighboring joints), and fitting is applied separately in each domain. While domain decomposition allows PSD to be applied to an entire character, it is limiting as it can capture only local deformations of the shape, and the design of the pose-space domains adds another layer of complexity to the rig. Ideally, a fitting scheme would directly handle a high-dimensional pose space, allowing for global deformations and a simpler rig.

Embodiments of the invention relate to an improved pose-space shape fitting methods that have intuitive behavior and scales to many dimensions, even when the amount of training data is small relative to the number of dimensions. Instead of solving a conventional scattered-data fitting problem, embodiments can behave like an animator choosing blendshape weights: embodiments can select the most parsimonious linear combination of all training poses that matches the target pose-space point. Mathematically, embodiments can form the problem as an $L_1$-minimization over a carefully constructed set of pose-space basis vectors.

II. Pose Space Fitting

Embodiments of the invention relate to a fitting function that produces intuitive, clean shape fitting in many dimensions. Typically, the fitting function may be based on training data comprising a plurality of training poses, each associated with the shape of an object. Although some examples refer to interpolation, embodiments can use various fitting techniques, and do not necessarily require that any function pass through a training pose. Accordingly, the term interpolation should be treated broadly to cover various combinations of training poses whose contributions and weights are determined as described herein.

Figure 3:
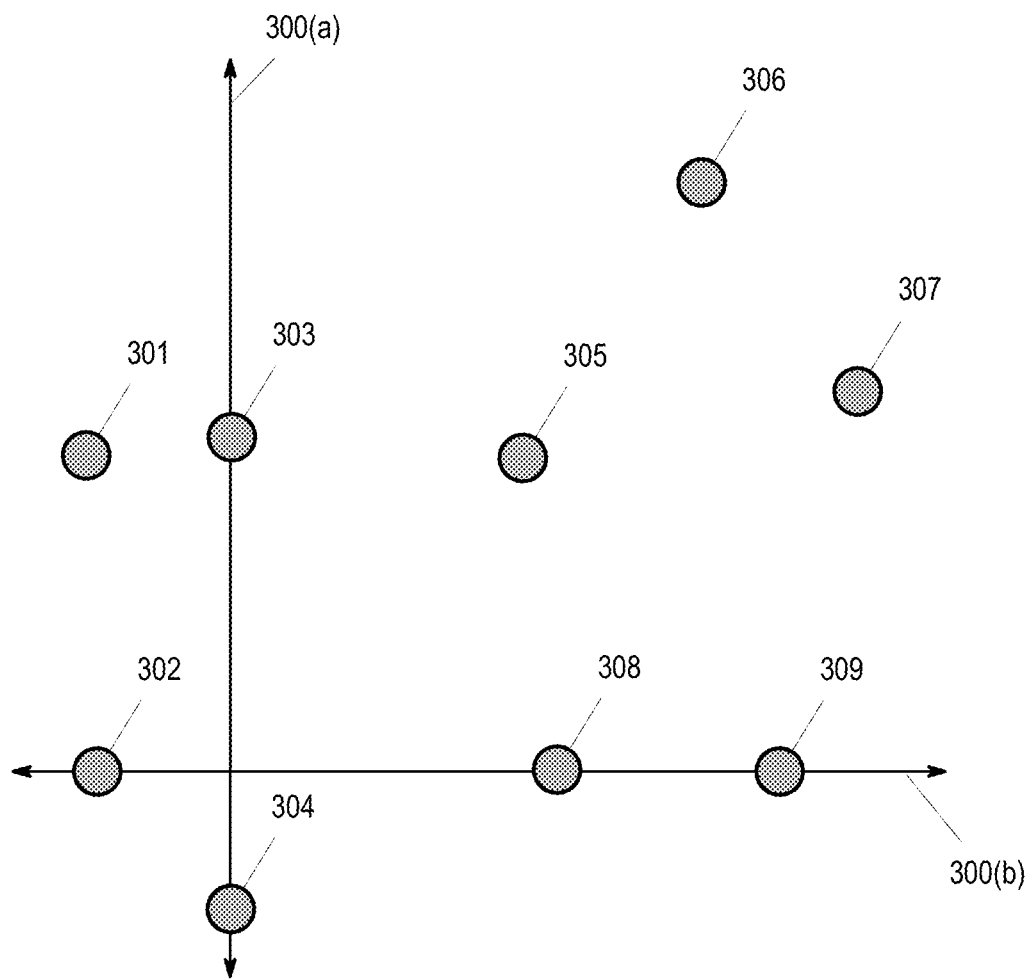
FIG. 3 shows a graph of a two dimensional pose space comprising a plurality of training data.

FIG. 3 shows a graph of a two dimensional pose space comprising a plurality of training data for an object. Each dimension shown in FIG. 3 corresponds to an animation variable: a first animation variable 300(a) is shown on the vertical axis, and second animation variable 300(b) is shown on the horizontal axis. The training data comprises a plurality of training poses 301-309, each of which may be associated with a training shape. The training poses 301-309 may have a positive, negative, or zero value for each animation variable. For example, training pose 301 has a positive value for animation variable 300(a), and a negative value for animation variable 300(b).

Figure 4:
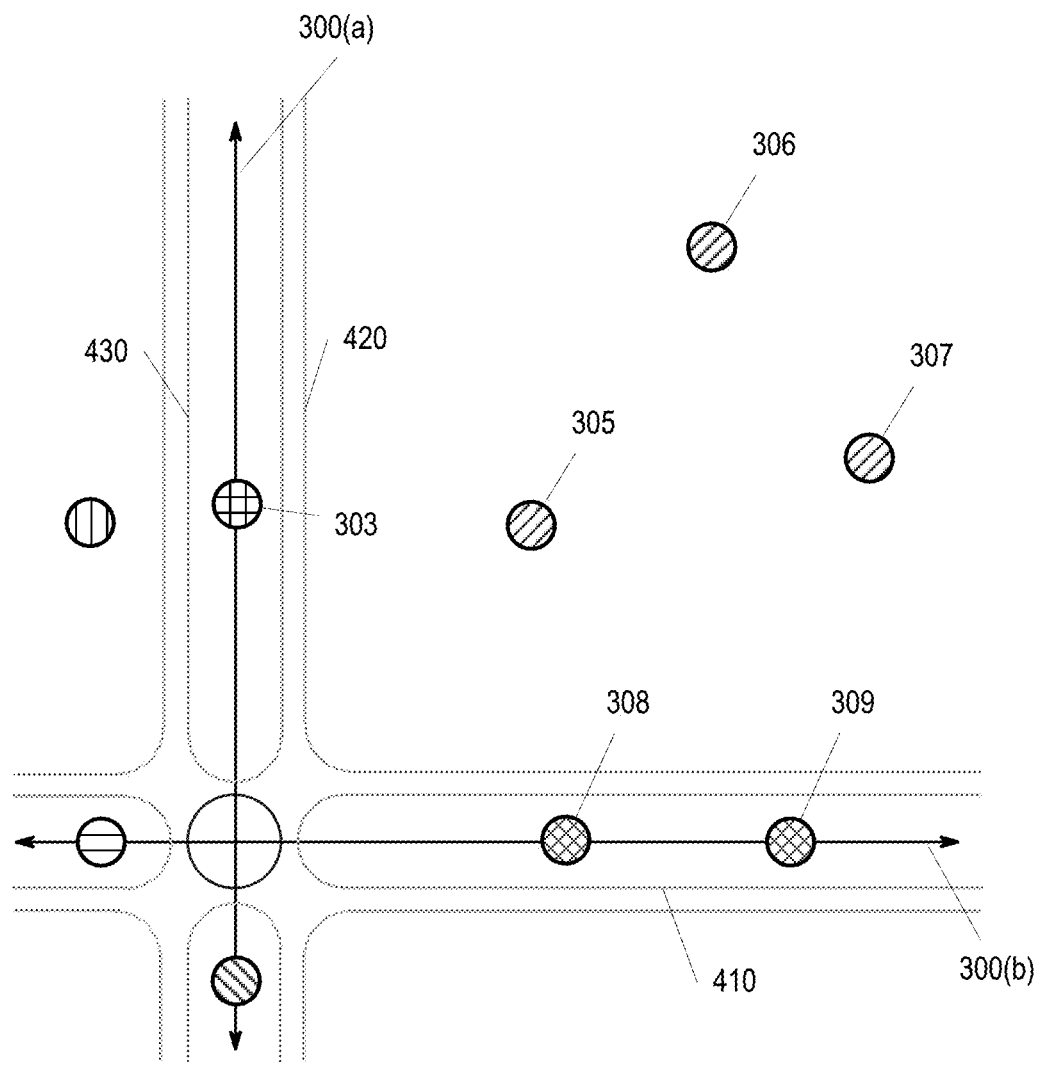
FIG. 4 shows a graph of a pose space with axis-aligned clusters.

Once training data for an object is determined, the training poses may be clustered. FIG. 4 shows a graph of a pose space with axis-aligned clusters. For example, training poses 308 and 309 both lie on axis 300(b) and share the same sign for animation variable 300(b), and so are grouped into a first cluster 410. Training poses 305, 306, and 307 all have positive values for both animation variables 300(a) and 300(b) (more generally, they lie strictly within the same quadrant in pose space), and so are grouped into a second cluster 420. Training pose 303 is the only training pose with a positive value for animation variable 300(a) and zero value for animation value 300(b), and so is the only training pose in a third cluster 430. Other training poses may be similarly clustered, as shown by the grey lines partitioning the pose space.

After the clustering process, a convex set may be determined for each of the clusters. The convex set may be any suitable a convex space that includes the training poses of a cluster. In some embodiments, the convex set may be a convex hull (i.e., the smallest convex set that includes all training poses of a cluster).

Figure 5:
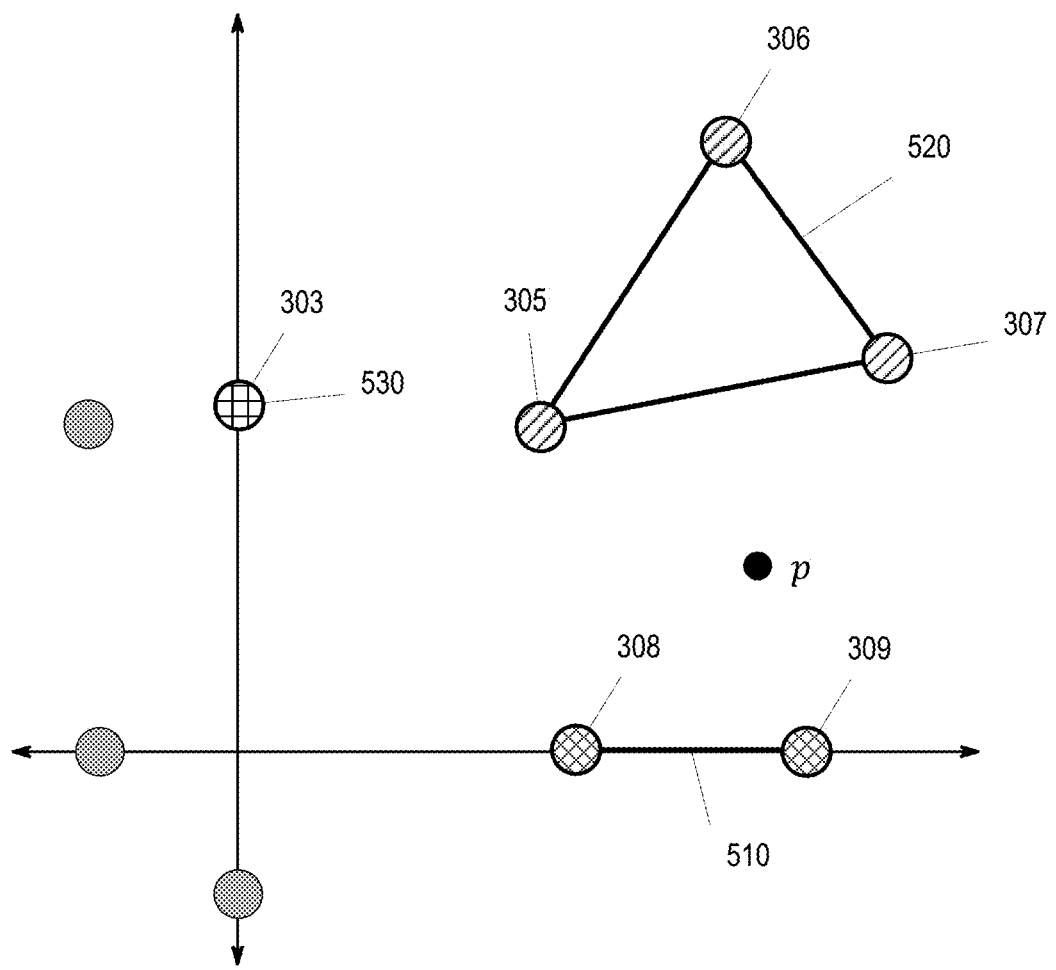
FIG. 5 shows a graph of a pose space with a convex hull determined for each cluster.

FIG. 5 shows a graph of a pose space with convex hulls shown for three clusters. The convex hull may in some cases occupy a single point, such as when a cluster includes a single training pose. Convex hull 530, which is coincident with training pose 303, is one such example. In other cases, the convex hull may be one-dimensional, such as when the training poses in the cluster are collinear (e.g., convex hull 510 comprising training poses 308 and 309). In yet other cases, the convex hull may be two-dimensional, such as when the training poses in the cluster are coplanar (e.g., convex hull 520 comprising training poses 305, 306, and 307). Although not illustrated in FIG. 5, in some cases the convex hull of a cluster can also occupy a volume or a hyper-volume.

After a convex set is determined for each cluster, a new desired pose may be specified. For example, an animator or other user may indicate a plurality of animation variables for the desired pose, and may request that a shape of the object in the desired pose be determined. Once the desired pose is specified, embodiments may identify a bid point for each cluster.

Figure 6:
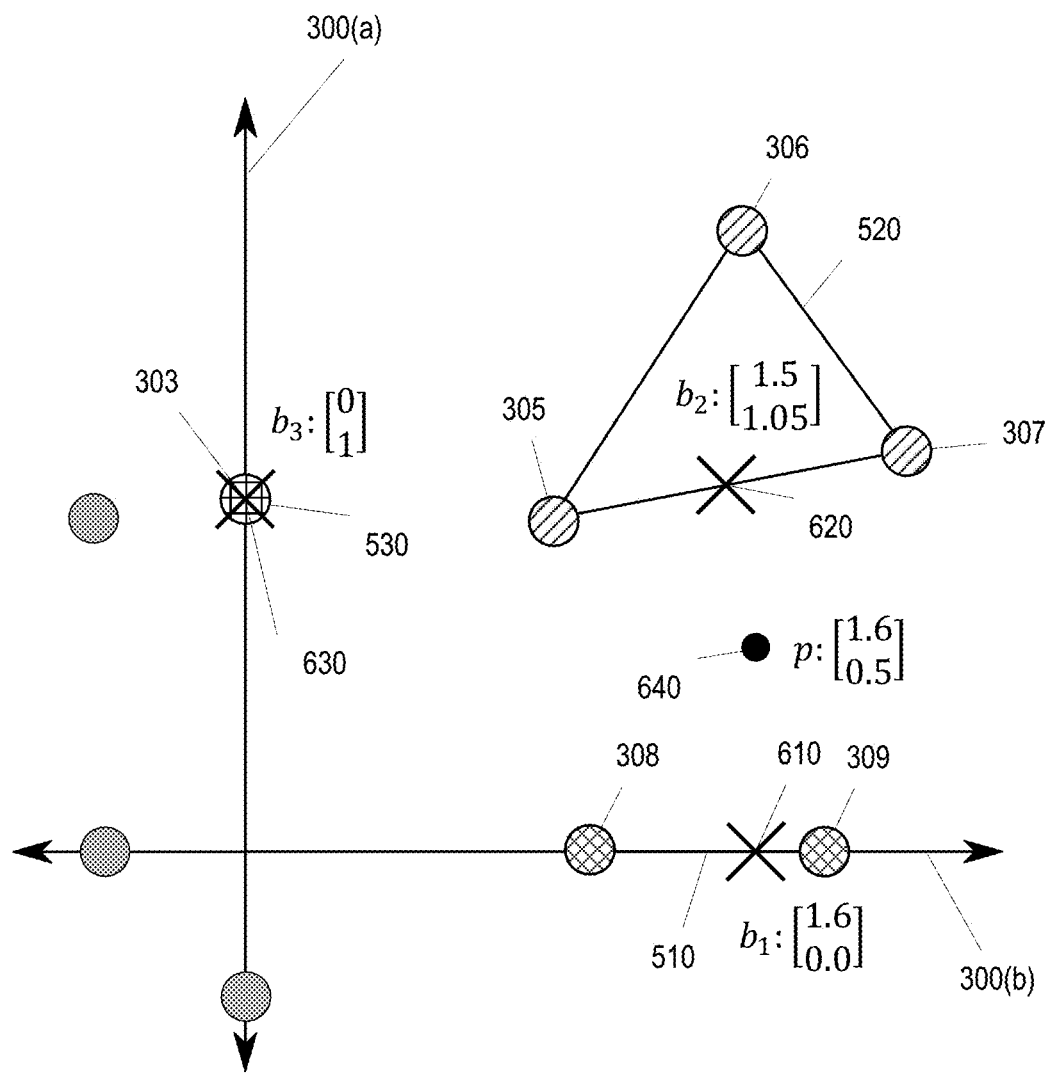
FIG. 6 shows a graph of a pose space including a desired pose and bid points associated with the desired pose for each cluster.

FIG. 6 shows a graph of a pose space including a desired pose p 640 and bid points 610, 620, and 630 associated with the desired pose p 640 for each cluster. The desired pose p 640 is represented as a two-dimensional vector (1.6, 0.5), where 1.6 is the value of animation variable 300($a$), and 0.5 is the value of animation variable 300($b$).

A bid point for the pose may be calculated in any suitable manner. In some embodiments, as shown in FIG. 6, the bid point may be a point in the convex hull of the cluster with the smallest Euclidean distance from the pose p 640. For example, the bid point 610 for cluster 510 may be located at the coordinates (1.6, 0). The bid point 620 for cluster 520 may be located at the coordinates (1.5, 1.05). The bid point 630 for cluster 530 may be located at the coordinates (0, 1). In some embodiments, the bid point of a cluster may be determined by projecting the desired pose onto the convex hull of the cluster.

The bid point of a cluster may be used to determine a cluster-fitted shape for the cluster. The bid point may be between training poses or away from the training poses, and thus can involve interpolation and extrapolation. A cluster-fitted shape may be a shape of the object determined from the training poses in a cluster. For example, the cluster-fitted shape may be a linear or non-linear combination of the training shapes associated with the training poses in the cluster. In some embodiments, the contribution of each training shape may be inversely proportional to the distance between the training pose and the bid point. In other words, the closer a training pose is to the bid point, the more influential the corresponding training shape may be in determining the cluster-fitted shape. For example, in some embodiments, a radial basis function (RBF)-based fitting method may be used.

The bid point of each cluster can also be used to calculate a weight for each cluster-fitted shape in determining the fitted shape of the object at the desired pose. For example, in some embodiments, the fitted shape of the object may be a linear combination of the cluster-fitted shapes. The weight of a cluster-fitted shape may be determined by the corresponding coefficient of the cluster-fitted shape in the linear combination.

In some embodiments, in order to determine the coefficient of each cluster-fitted shape, a basis vector may be determined for each cluster from the origin to the bid point of that cluster. The basis vectors may be normalized (e.g., to a fixed length, such as 1), and a "basis pursuit" to the desired pose p may be determined: a linear combination of the normalized basis vectors that results in the desired pose p. In some cases, such as when there are multiple possible linear combinations, the basis pursuit to p may be the sparsest combination of the basis vectors may be determined. For example, in some embodiments, the sum of the magnitude of the coefficients may be minimized (i.e., $L_1$ minimization) with the constraint of the resulting vector being at or near the desired pose p.

Figure 7:
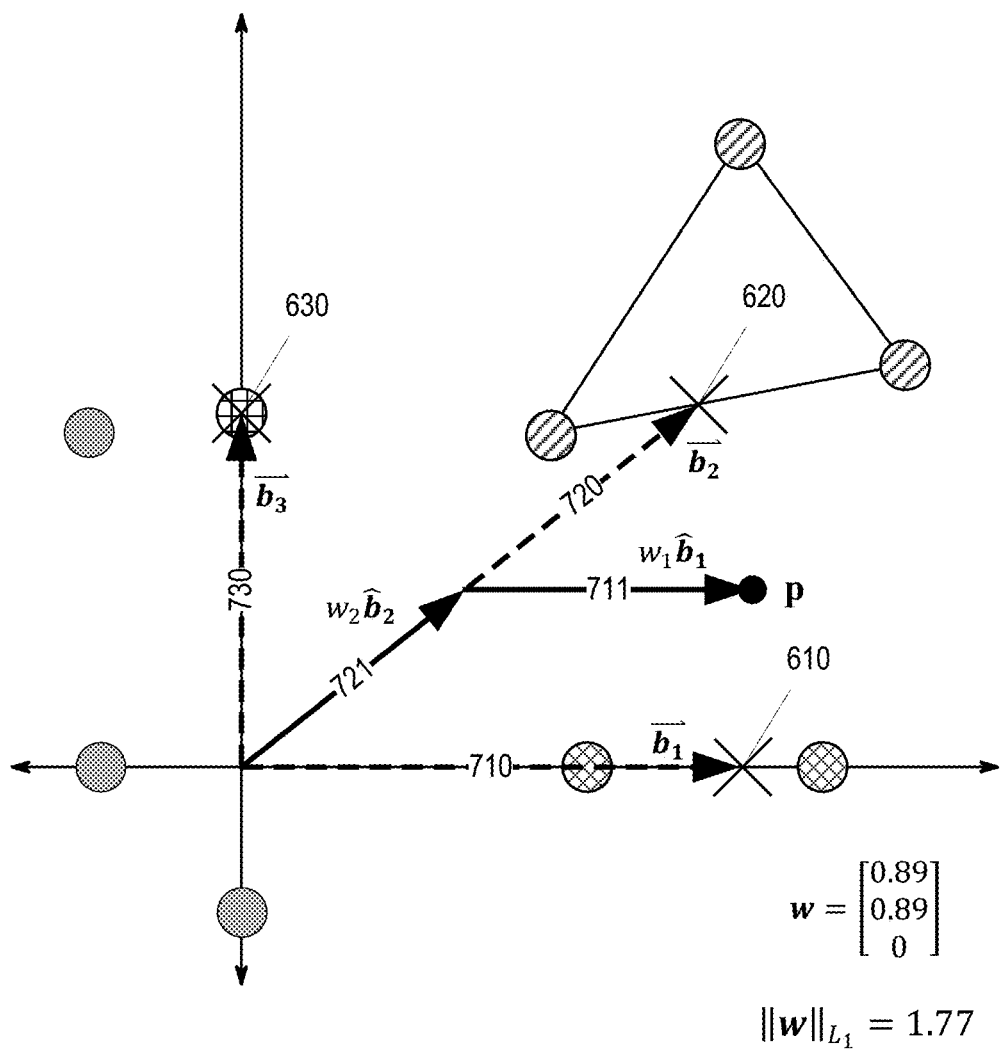
FIG. 7 shows a plurality of basis vectors defined by bid points, and an optimal $L_1$ minimization of the basis vectors.

FIG. 7 shows a plurality of basis vectors 710, 720, and 730 to bid points 610, 620, and 630, respectively. Specifically, basis vector $\vec{b}_1$ 710 is a vector from the origin to bid point 610. Basis vector $\vec{b}_2$ 720 is a vector from the origin to bid point 620. Basis vector $\vec{b}_3$ 730 is a vector from the origin to bid point 630. In some embodiments, each of the basis vectors may be normalized to determine normalized basis vectors $\hat{b}_1$, $\hat{b}_2$, and $\hat{b}_3$. The normalized basis vectors may then be used to determine an $L_1$ minimization of a basis pursuit to desired pose p 640, such that $$p = \begin{bmatrix} \hat{b}_1 & \hat{b}_2 & \hat{b}_3 \end{bmatrix} \begin{bmatrix} w_1 \\ w_2 \\ w_3 \end{bmatrix}.$$

As shown in FIG. 7, the $L_1$ minimization may comprise the weights vector $$w = \begin{bmatrix} 0.88 \\ 0.89 \\ 0 \end{bmatrix},$$

resulting in $\|w\|_{L_1} = 0.88 + 0.89 + 0 = 1.77$.

Thus, in order to determine a fitted shape for the pose, embodiments may multiply the cluster-fitted shape for cluster 610 by 0.88, and add it to the cluster-fitted shape for cluster 620 multiplied by 0.89. The linear combination can be visualized as the sum of $w_2 \hat{b}_2$ 721 and $w_2 \hat{b}_2$ 711, which when arranged end-to-end reach the desire pose p.

Figure 8:
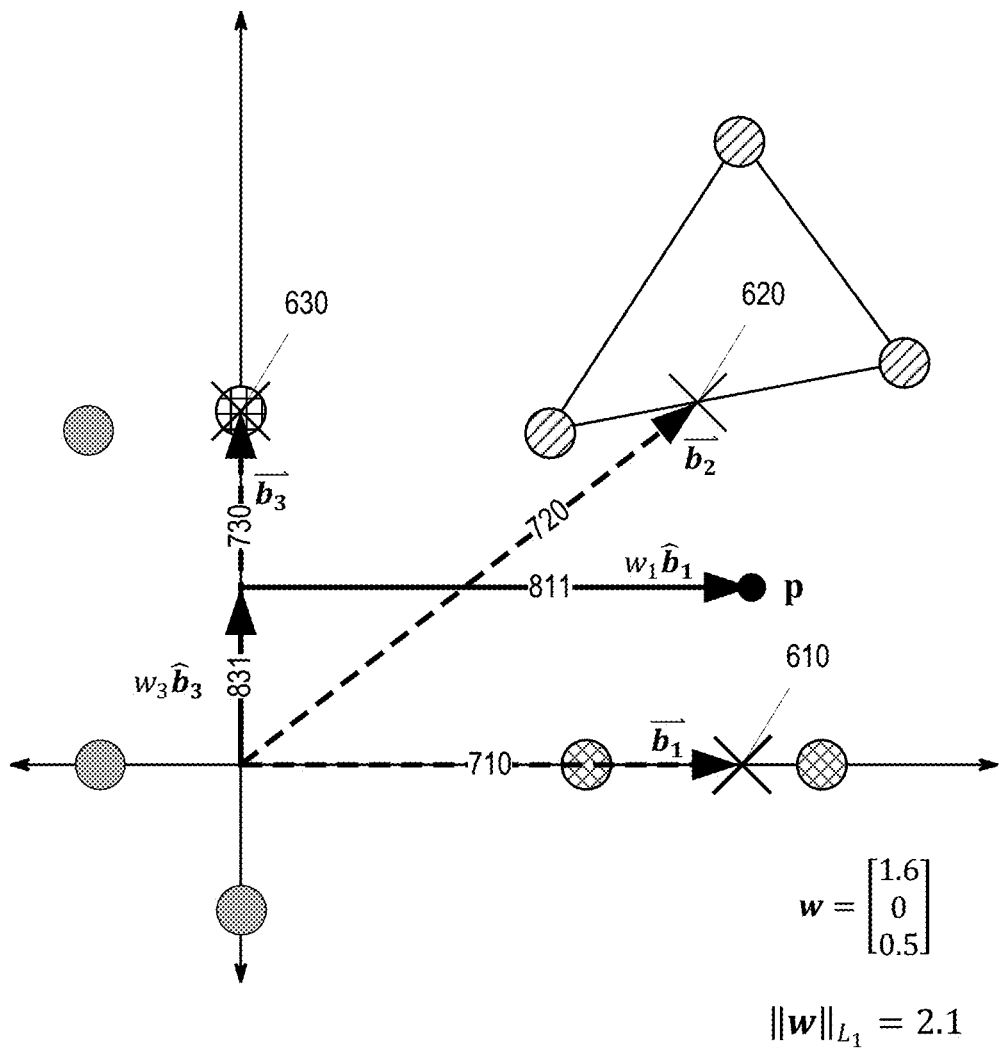
FIG. 8 shows a plurality of basis vectors defined by bid points, and a non-optimal linear combination of the basis vectors.

It should be noted that in some cases, there may be multiple valid combinations of weights. FIG. 8 shows a plurality of basis vectors defined by bid points, and a non-optimal $L_1$ linear combination of the basis vectors. As shown in FIG. 8, a linear combination of normalized basis vectors $\hat{b}_1$, $\hat{b}_2$, and $\hat{b}_3$ with weights of $$w = \begin{bmatrix} 1.6 \\ 0 \\ 0.5 \end{bmatrix}$$

may also equal p, but may result in $\|w\|_{L_1} = 1.6 + 0 + 0.5 = 2.1$. Thus, this combination of basis vectors is not optimal with respect to $\|w\|_{L_1}$ (e.g., the weights vector shown in FIG. 7 results in a smaller $L_1$ norm).

Figure 9:
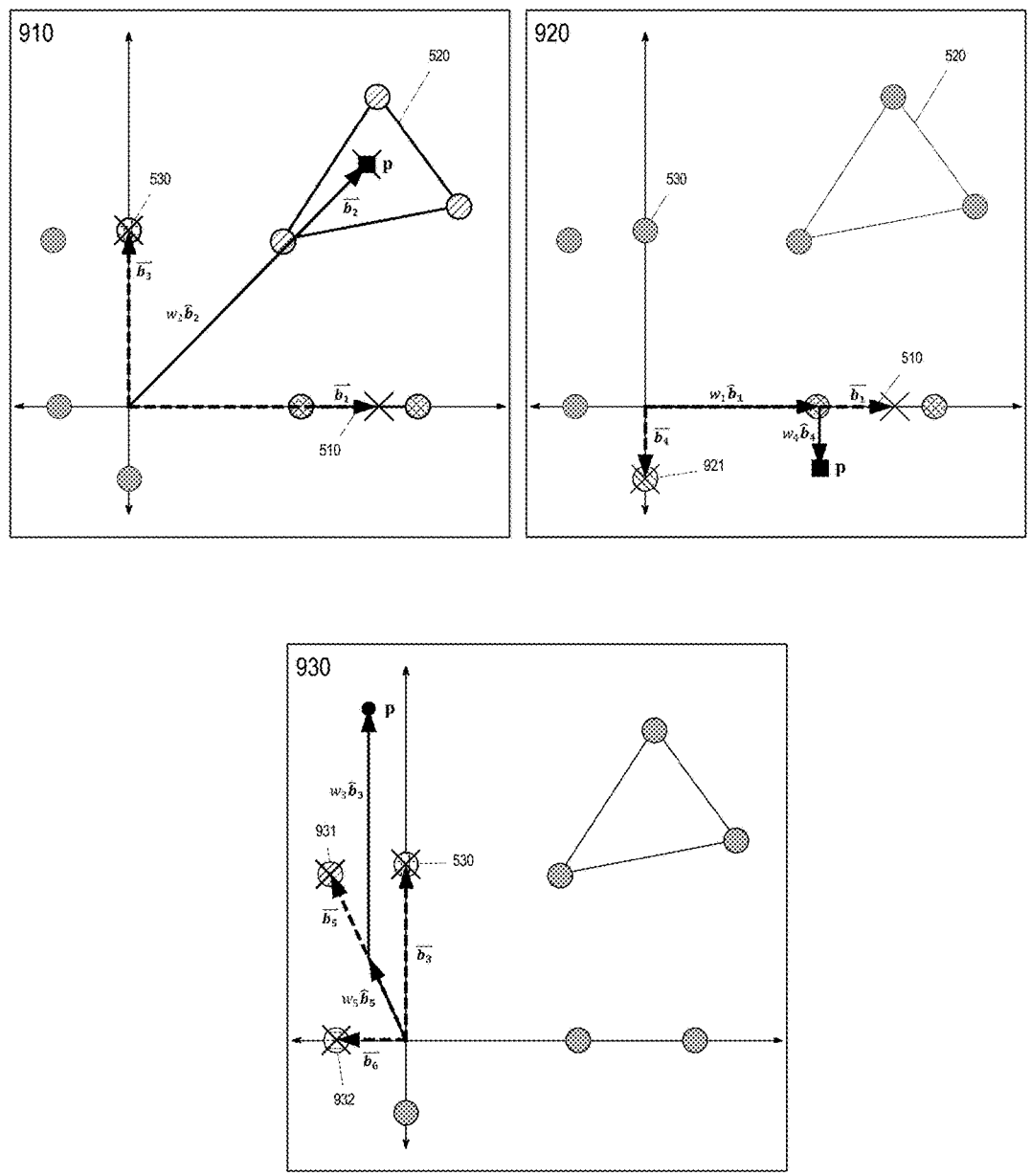
FIG. 9 shows an example fitting for each of three poses in accordance with some embodiments of the invention.

FIG. 9 shows three examples 910, 920, and 930 of fitting according to some embodiments, each example relating to a different desired pose p.

In example 910, the desired pose p is within the convex hull of a cluster 520. Accordingly, the bid point of cluster 520 is at the same position as the desired pose p. Further, as shown in example 910, the basis pursuit to desired pose p consists solely of a normalized basis vector $\hat{b}_2$ multiplied by a weight $w_2$. Thus, in example 910, the fitted shape for the object at the desired pose p is the same as the cluster-fitted shape for cluster 520 containing p.

In example 920, the desired pose p is in a quadrant of the pose space corresponding to a negative value for animation variable 300(a), and a positive value for animation variable 300(b). Accordingly, although cluster 510 is used for fitting, clusters 520 and 530 are not used because they both correspond to positive values for animation variable 300(a). Instead, cluster 921 is used, since it corresponds to a negative value for animation variable for animation variable 300(a) and a zero value for animation variable 300(b). Thus, the basis pursuit to p may be in terms of a basis vector $\vec{b}_1$ to the bid point for cluster 510, and a basis vector $\vec{b}_4$ to the bid point for cluster 921.

In example 930, the desired pose p is in a quadrant of the pose space corresponding to a positive value for animation variable 300(a) and a negative value for animation variable 300(b). Accordingly, clusters 530, 931, and 932 are used to fit the shape of the object at pose p. Thus, the basis pursuit to p may be in terms of a basis vector $\vec{b}_3$ to the bid point for cluster 530, a basis vector $\vec{b}_5$ to the bid point for cluster 931, and a basis vector $\vec{b}_6$ to the bid point for cluster 932.

III. Fitting Methods

In some embodiments, for an N-dimensional pose space and M training shapes at pose-space positions (i.e., training poses) $t_i$, a fitting function $f$ may be defined as:

$$f(p): \mathbb{R}^N \Rightarrow \mathbb{R}^M, f(t_i) = \delta_{ii}$$

That is, the fitting function $f$ may be a function of a desired pose p from N to M dimensions, and $f(t_i)$ may be a vector of weights for each of the M training shapes, with one at the ith position and zero elsewhere ($\delta$ is the Kronecker delta). In some embodiments, $f$ can be expressed as a linear combination of low-dimensional functions, each of which is defined over a subset of the animation controls:

$$f(p) = \sum_{c=1}^{k} w_c f_c(b_c)$$

In accordance with the above equation, training data may be partitioned into k clusters according to the associated animation controls. Each cluster c may have a low-dimensional function $f_c$ that produces weights for each shape in the cluster c, along with a pose-space bid $b_c$. In some embodiments, the pose space bid $b_c$ may be a function of the desired pose p. In other embodiments, the low dimensional function $f_c$ may be calculated directly from the desired pose p. The weights $w_c$ may be solved for using a sparsity-seeking optimization to find the most parsimonious combination of bids $b_c$ that matches p.

Figure 10:
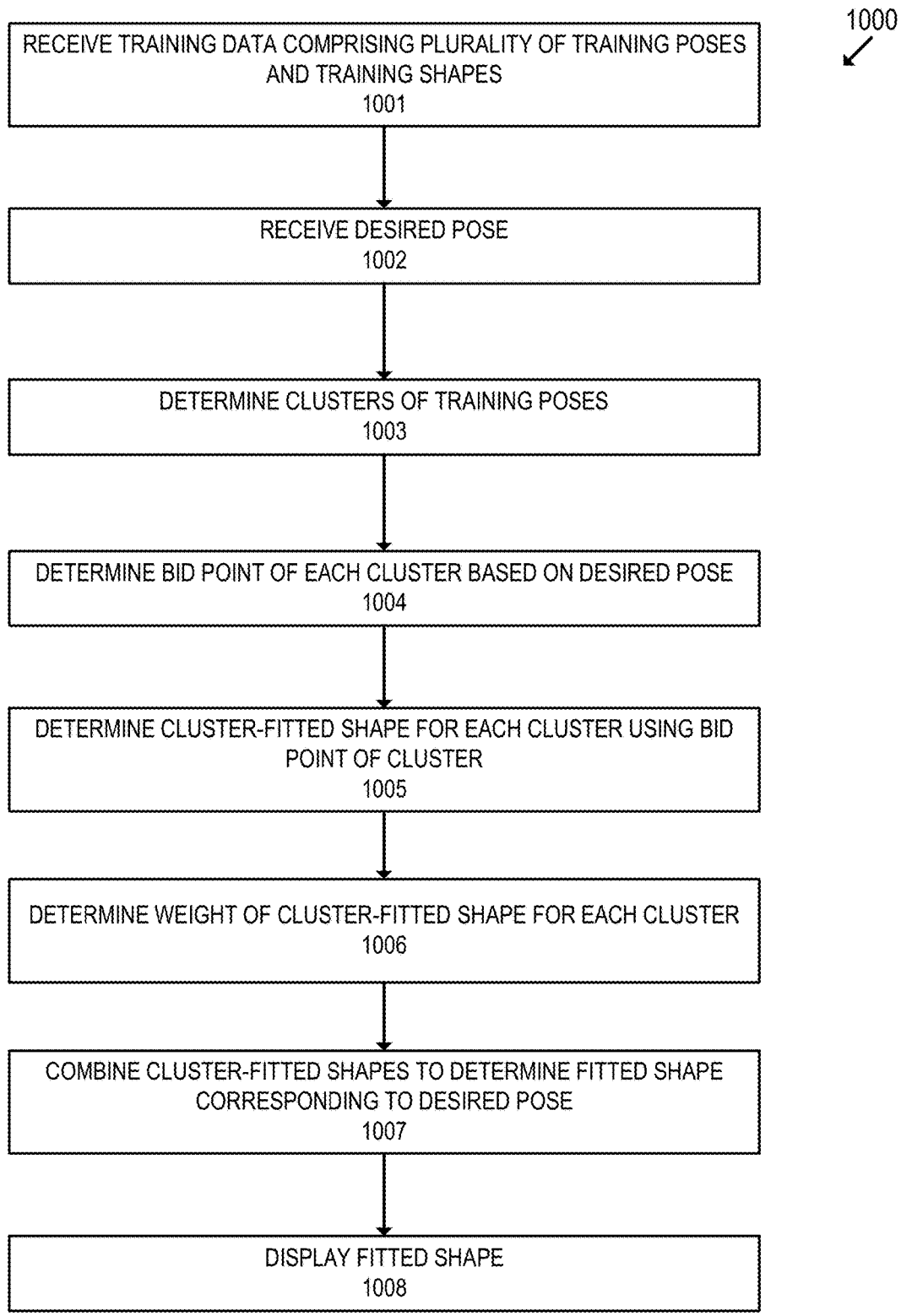
FIG. 10 shows a method of fitting the shape of an object.

FIG. 10 shows a method 1000 of determining a fitting function $f$ and using $f$ to determine the shape of an object. All or some of the blocks can be performed by a computer system, including various subcomponents of a computer system.

At block 1001, training data comprising a plurality of training poses $t_i$ and training shapes is received for the object. Training data may be determined in any suitable manner. For example, in some embodiments, an animator, rigger, or other user may generate training data by indicating acceptable shapes for an object at various training poses.

At block 1002, a desired pose p is received. For example, in some embodiments, a user may indicate values for a plurality of animation variables used to control a pose for the object. A desired pose p may be visualized as a vector in an N-dimensional pose space, wherein the coordinates of $p=[p_1 \ldots p_N]^T$ are determined by the values of N animation variables.

At block 1003, clusters of training poses are determined. In order to cluster the training poses, embodiments may group the training poses $t_i$ by the lowest-dimensional, axis-aligned, signed, subspace that they lie in. Specifically, in some embodiments, two training poses $t_i$ and $t_j$ may lie in the same cluster if and only if they have the same number of nonzero values, and each nonzero value of $t_i$ has the same sign as its counterpart in $t_j$. Such clustering can group together sites that lie on the same axis, sites that lie (strictly) in the same quadrant, and so on. However, it should be appreciated that other clustering methods may be used in embodiments of the invention. The clustering can be performed before or after the new pose is received. In some embodiments, a convex set of training poses in pose space may be defined for the cluster.

At block 1004, a bid point of each cluster is determined based on the desired pose. The bid point may include any coordinate within a cluster in pose space that is considered most similar to a desired pose. For example, in one embodiment, the function $f_c(p)$ may be an fitting function defined using only the subset of $t_i$ training poses that lie in cluster c. Then the bid point $b_c$ may be the closest point to p such that $f(b_c) = f_c(b_c)$.

The closest point within a cluster c to a desired pose p may be determined in any suitable manner. For example, in some embodiments, the closest point may be the point within the cluster with the smallest Euclidean distance to the desired pose. In some embodiments, the closest point may be determined by projecting the desired pose p onto the convex hull of cluster c. One such embodiment is described in further detail with reference to FIG. 11. Intuitively, the bid point may be the closest point to p where the low-dimensional function $f_c$ is "trusted" to produce the correct value.

At block 1005, a cluster-fitted shape $f_c(b_c)$ is determined for each cluster. The cluster-fitted shape $f_c(b_c)$ may include a shape of an object that is fit for a pose corresponding to the bid point $b_c$ of a cluster. The cluster-fitted shape may be represented in any suitable form. For example, in some embodiments, the cluster-fitted shape may be a weighted combination of the training shapes of a cluster. In such embodiments, the cluster-fitted shape at a bid point $b_c$ may be expressed as $v_c = f_c(b_c)$. In other words, $v_c$ may be an M-dimensional vector indicating the weight of each training shape within the cluster (and a zero weight for training shapes outside of the cluster), such that the cluster-fitted shape is a weighted combination of the training shapes.

In some embodiments a linear radial basis function (RBF) formulation can be used to determine the cluster-fitted shape as a linear combination of the training shapes within the cluster, such that:

$$f_c(b_c) = \sum_{j=1}^{m} \lambda_j t_j^c \| t_j^c - b_c \|$$

In other words, the cluster-fitted shape $f_c(b_c)$ for a cluster c at a bid point $b_c$ may be the sum of the m training shapes at the training poses $t_j^c$ within a cluster c, multiplied by the distance from each training pose to the bid point $\|t_j^c - b_c\|$, multiplied by a weight of each training pose $\lambda_j$. In some embodiments, the method of FIG. 12 may be used to determine a cluster-fitted shape for a cluster.

However, it should be noted that embodiments are not limited to using a linear RBF to determine a cluster-fitted shape. Embodiments may, for example, use simplicial interpolation or any other suitable combination of the training poses instead of RBF. However, the RBF formulation has several properties suitable for use with embodiments: it extends directly to N dimensions in the unlikely case that the cluster c is high-dimensional, it provides exactly piecewise linear fitting in one dimension and smooth, predictable fitting in higher dimensions, and the poor extrapolation behavior of the RBF method is hidden because we project to the convex hull of the data to produce the bid point $b_c$.

At block 1006, a weight $w_c$ for each cluster-fitted shape is determined. In some embodiments for finding $w_c$, one can convert the bids into a basis for pose space, then find the "basis pursuit" of the desired pose p: the simplest projection—i.e., lowest weight in the $L_1$ sense—of p into a set of basis vectors defined by the bid points of the clusters. In other words, the sum of the magnitude of the coefficients in the linear combination that sums to p can be minimized. This approach produces a function $f$ that linearly interpolates between the bids, which may be a desirable property for animators. In some embodiments, the method of FIG. 13 may be used to determine weights for the cluster-fitted shapes.

At block 1007, the cluster-fitted shapes are combined to determine a fitted shape corresponding to the desired pose. Typically, the cluster-fitted shapes may be combined using the weights of each cluster-fitted shape determined at block 1006. For example, in one embodiment, a cluster-fitted shape for a cluster c may be associated with a vector $v_c$ representing the shape weights of the training shapes in the cluster that are combined to form the cluster-fitted shape. The cluster-fitted shape weights $v_c$ may be scaled (e.g., to a fixed length) to determine scaled cluster-fitted shape weights $\hat{v}_c = v_c / \|b_c\|$. The scaled cluster-fitted shape weights $\hat{v}_c$ for each of k clusters c may be formed into an M×k matrix V, and the weight of each cluster c may be formed into a k×1 weights vector w. A fitting function may then be expressed as:

$$f(p) = Vw$$

The product Vw may then be computed to determine the fitted shape for the object at the desired pose p. For example, the product Vw may be used to determine a position for one or more control vertices of an object.

At block 1008, the fitted shape is displayed. In some embodiments, the user can then accept the new shape or modify it to an accepted position. At that point, the new shape can be used as a training pose to determine future new poses, e.g., when the user is a rigger.

A. Bid Point Determination Methods

Figure 11:
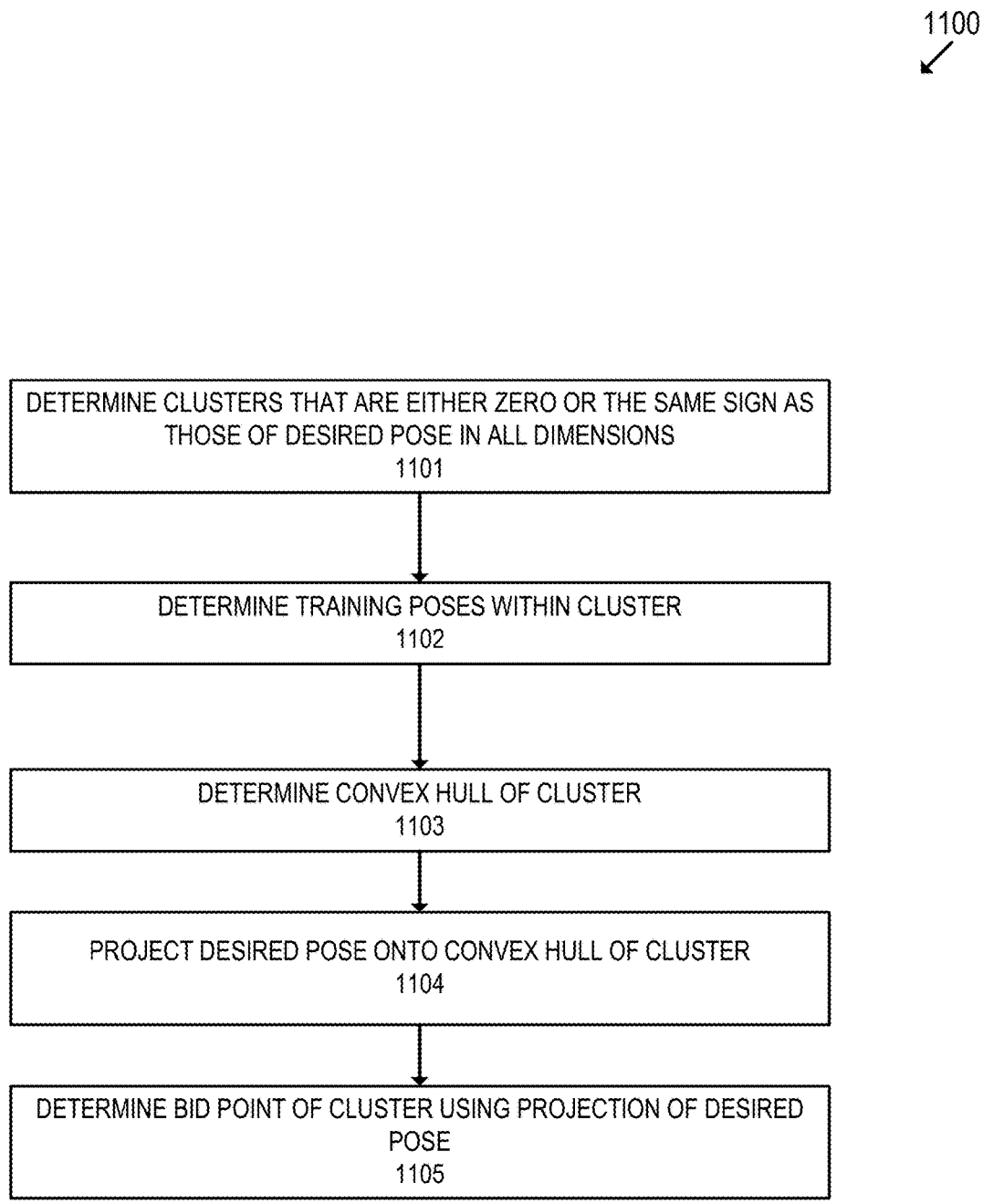
FIG. 11 shows a method of determining a bid point of a cluster.

FIG. 11 shows a method 1100 of determining a bid point of a cluster. Typically, method 1100 may be performed after a cluster of poses is determined. For example, method 1100 may be performed during block 1004 of method 1000.

At block 1101, clusters that are either zero or the same sign as those of the desired pose for all animation variable values are determined. In some cases, riggers may desire that "positive" and "negative" shapes should not mix, and so any clusters that differ in sign from the desired pose p in any dimension are not used in the fitting process. Disregarding clusters that differ in sign may also be useful to enforce continuity of the fitting function $f$ as discussed with reference to FIG. 10.

Specifically, if a desired pose has a positive value for an animation variable, only clusters with positive or zero values for that animation variable may be used for fitting. Analogously, if a desired pose has a negative value for an animation variable, only clusters with negative or zero values for that animation variable may be used for fitting. In some embodiments, if a desired pose has a zero value for an animation variable, then only clusters with zero values for that animation variable may be used for fitting. FIG. 5 illustrates one example of such a determination. As shown in FIG. 5, the desired pose p is in a quadrant with a positive value for both dimensions. Accordingly, only clusters 510, 520, and 530 are used for fitting a shape for the pose p. Training poses for clusters not used for fitting are shown in grey.

At block 1102, the training poses within a cluster are determined for each of the clusters determined in step 1101. For example, with reference to FIG. 5, cluster 510 comprises training poses 308 and 309, cluster 520 comprises training poses 305-307, and cluster 530 comprises training pose 303.

At block 1103, the convex hull of the cluster is determined. Depending on the number of dimensions in which the cluster varies and the training poses, the space enclosed by the convex hull may be a point (in the case of a cluster with a single training pose), a line (in the case of collinear training poses), a plane (in the case of coplanar training poses), a volume, or a hyper-volume.

At block 1104, the desired pose is projected onto the convex hull of the cluster. Any suitable algorithm, such as Wolfe's algorithm, may be used for performing such a projection. Further details on Wolfe's algorithm may be found in the publication entitled "Finding the nearest point in a polytope," by P. Wolfe, published in *Mathematical Programming* 11, volume 1, pages 128-149, in 1976.

At block 1105, the result of the projection is determined to be the bid point of the cluster. Examples of bid points for a desired pose p are shown in FIG. 6. As shown in FIG. 6, the bid point 610 for cluster 510 is at the coordinates (1.6, 0). The bid point 620 for cluster 530 is at the coordinates (1.5, 1.05). The bid point 630 for cluster 530 is at the coordinates (0, 1). As can be seen visually, the bid points are the points within the cluster with the shortest Euclidean distance from the desired pose p.

B. Cluster-Fitted Shape Determination Methods

Figure 12:
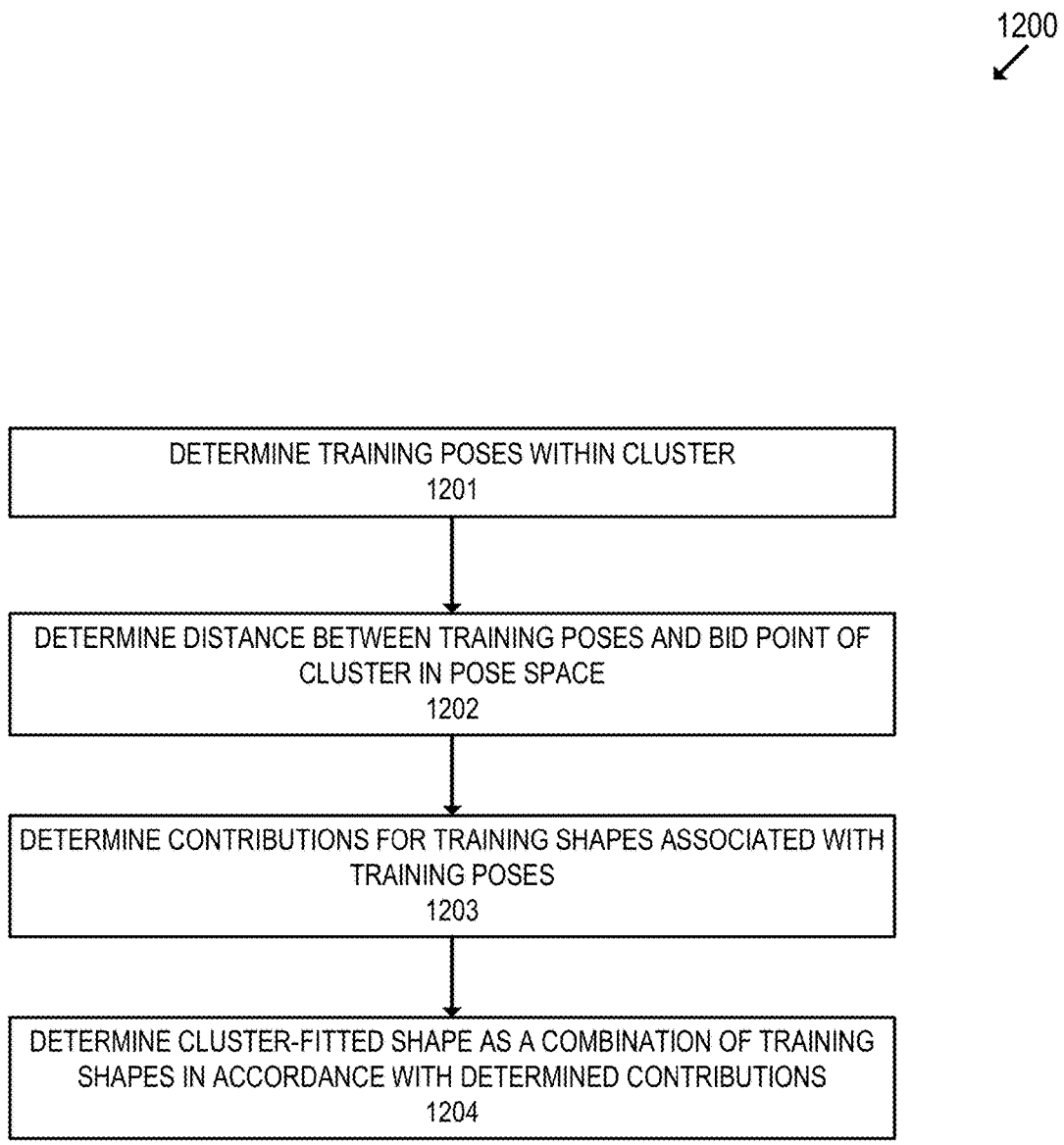
FIG. 12 shows a method of determining a cluster-fitted shape for a cluster.

FIG. 12 shows a method 1200 of determining a cluster-fitted shape for a cluster. Typically, method 1200 may be performed after a bid point for a cluster is determined. For example, method 1200 may be performed during block 1005 of method 1000.

At block 1201, training poses $t_j^c$ within a cluster c are determined. For example, with reference to FIG. 5, cluster 510 comprises training poses 308 and 309, cluster 520 comprises training poses 305-307, and cluster 530 comprises training pose 303.

At block 1202, a distance $\|t_j^c - b_c\|$ between each of the training poses and the bid point of the cluster is determined.

For example, with reference to FIG. 6, the distance between bid point $b_1$ 610 and each of the training poses 508 and 509 in the corresponding cluster may be determined. Similarly, the distance between bid point $b_2$ 620 and training poses 305-307 may be determined. In the case of bid point $b_3$ 630, there is only one training pose 303 in the corresponding cluster. Thus, the distance between the bid point $b_3$ 630 and the training pose 303 is zero.

At block 1203, contributions for the training shapes associated with the training poses are determined. In some embodiments, the cluster-fitted shape can be expressed as a vector $v_c$ of shape contributions. For example, a shape contribution vector $$v_c = \begin{bmatrix} 1 \\ 0 \end{bmatrix}$$

would indicate that a cluster-fitted shape is equal to a first of two training shapes, and shape contribution vector $$v_c = \begin{bmatrix} 0.5 \\ 0.5 \end{bmatrix}$$

would indicate that the cluster-fitted shape is an equal combination of both training shapes.

The contributions for the training shapes may be determined in any suitable manner. For example, in some embodiments, the contribution of a training shape may be inversely proportional to the corresponding distance determined at block 1202. In some embodiments, a radial basis function (RBF)-based formulation may be determined, wherein:

$$v_c = f_c(x) = \sum_{j=1}^{m} \lambda_j t_j^c \|t_j^c - x\|$$

In such a formulation, the shape contribution $v_c$ for a fitted shape at a position in pose space x in a cluster c is the summation of: the m training shapes at the training poses $t_j^c$ within a cluster c, multiplied by the distance from each training pose to the position $\|t_j^c - x\|$, and multiplied by a weight of each training pose $\lambda_j$.

In some embodiments, the contribution of each training pose $\lambda_j$ may be solved for by constraining the value of $f_c(x)$ for certain values of x. For example, in some embodiments, the constraint $f_c(t_j^c) = \delta_{ij}$ may imposed, where $\delta$ is the Kronecker delta. In other words, the shape fitted at a training pose may simply be the training shape corresponding to the training pose. This may be represented in a shape contribution vector $v_c$ as a "1" value for the corresponding training shape, and a "0" value for every other training shape. Given the training shapes at each of the m training poses, a system of m equations of in the above form can be constructed. The contribution $\lambda_j$ of each training pose may then be solved using a least-squares fit, a subspace projection, or any other suitable method for solving the system.

At block 1204, a cluster-fitted shape is determined as a combination of the training shapes in accordance with the determined contributions. For example, in some embodiments, once the training pose contributions $\lambda_j$ are determined, a cluster-fitted shape may be determined at the bid point using the equation:

$$v_c = f_c(b_c) = \sum_{j=1}^{m} \lambda_j t_j^c \|t_j^c - b_c\|$$

The resulting shape weights vector $v_c$ may represent the cluster-fitted shape.

C. Cluster-Fitted Shape Weight Determination Methods

Figure 13:
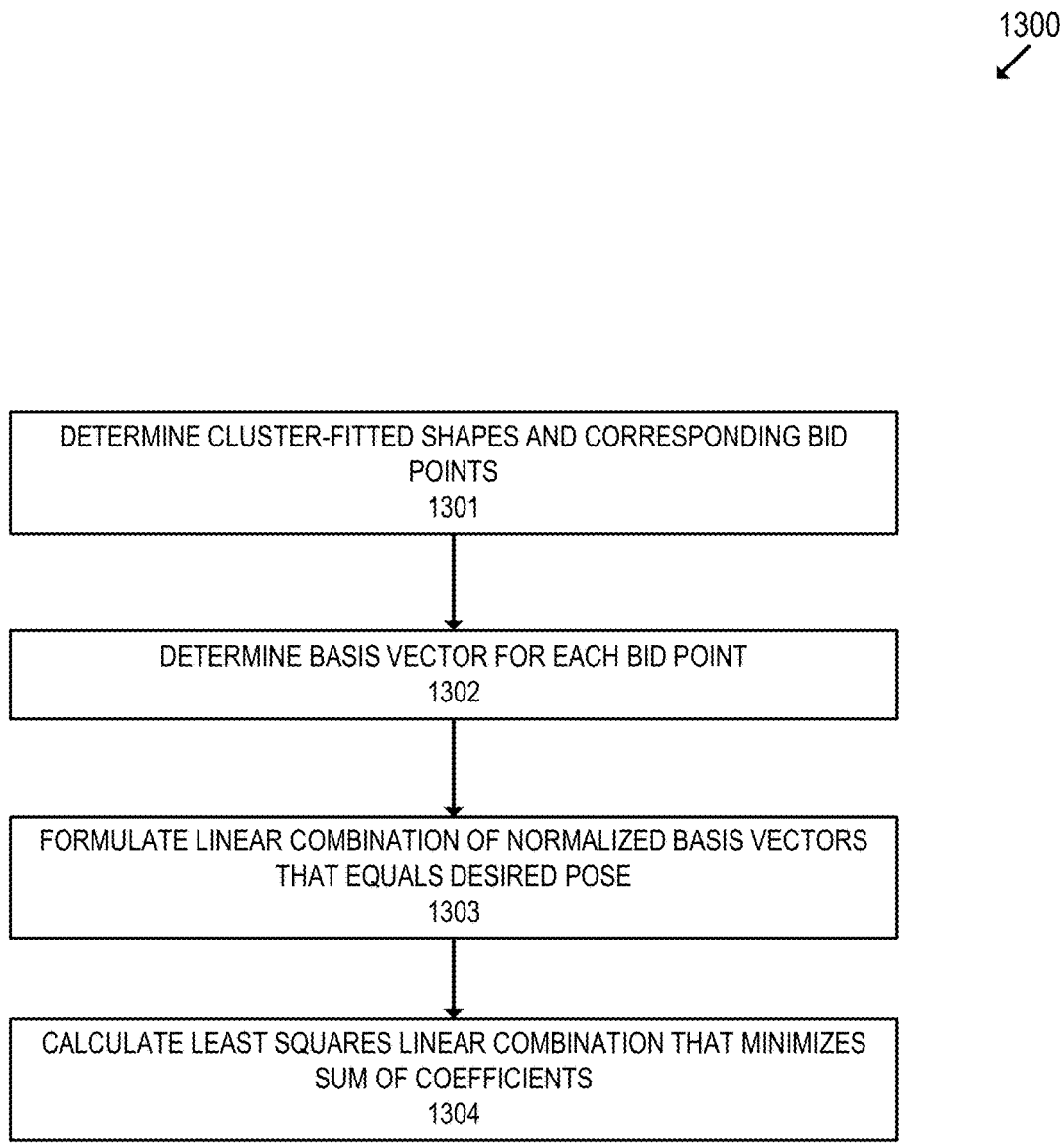
FIG. 13 shows a method of determining a weight of a cluster-fitted shape.

FIG. 13 shows a method 1300 of determining a weight for a cluster-fitted shape. Typically, method 1300 may be performed after cluster-fitted shapes have been determined for a plurality of clusters. For example, method 1300 may be performed during block 1006 of method 1000.

At block 1301, cluster-fitted shapes and corresponding bid points are determined. For example, in some embodiments, the bid points may be determined in accordance with method 1100. In some embodiments, the cluster-fitted shapes may be determined in accordance with method 1200.

At block 1302, a basis vector $\vec{b}$ for each bid point is determined. The basis vector may be a vector from the origin to the bid point. For example, in FIG. 7, a basis vector $\vec{b_1}$ 710 may be defined using a bid point 610, a basis vector $\vec{b_2}$ 720 may be defined using a bid point 620, and a basis vector $\vec{b_3}$ 730 may be defined using a bid point 630.

At block 1303, a linear combination of normalized basis vectors that equals the desired pose is formulated. In some embodiments, normalizing the basis vectors may comprise scaling the basis vector to a fixed length. For example, a normalized basis vector $\hat{b}_c$ may be determined as $\hat{b}_c = \vec{b}_c / \|b_c\|$, where $\|b_c\|$ is the magnitude or norm of $\vec{b}_c$.

At block 1304, a linear combination that minimizes the sum of the coefficient is calculated. In some embodiments, the normalized basis vectors $\hat{b}_c$ for each of k clusters c may be formed into an M×k matrix B, and the weight of each cluster c may be formed into a k×1 weights vector w. The desired pose can then be formulated as:

$$p = Bw$$

In some embodiments, the weights vector w may be determined such that the L1 norm of the weights vector is minimized. In other words, embodiments may solve the formulation:

$$\text{minimize}(\|w\|_{L1}) \text{ subject to } p = Bw$$

Any suitable optimization algorithm may be used to determine the weights vector w. For example, in some embodiments, algorithms for solving Lasso problems, such as least-angle regression, may be used.

IV. Comparison to Other Techniques

Figure 14:
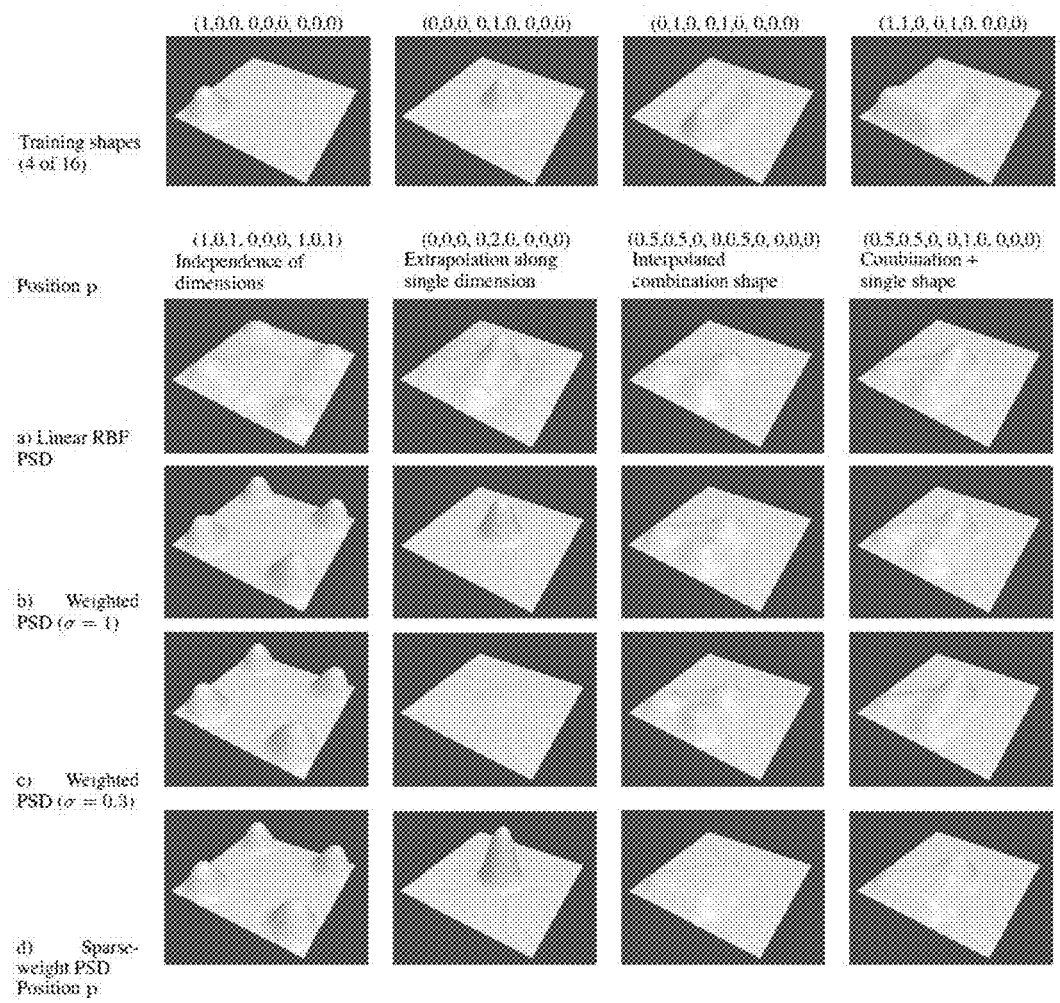
FIG. 14 shows graphs comparing the performance of fitting methods for example training data.

FIG. 14 shows graphs comparing the performance of various fitting methods for example training data. Shown in the top row is a sample of four of the sixteen training poses in a 9-dimensional pose space. First column: when tested at a new position away from the training data, the naive RBF method produces a messy average of all the training shapes. A weighted pose space deformation (WPSD) approach solves a separate PSD problem for each vertex, producing the proper four independent bumps. Sparse-weight PSD, which may involve techniques corresponding to embodiments of the invention, solves a single PSD problem for all shapes, but produces a similar result to WPSD. Second column: extrapolation beyond the training set is also bad for naive RBF methods. Weighted PSD improves extrapolation behavior, but the magnitude of the extrapolation depends on the radius of the RBF (a). In contrast, sparse-weight PSD produces clean extrapolation behavior without parameter tuning Third and fourth columns: all RBF-based approaches produce a lumpy, unintuitive result when fitting in multiple, dependent dimensions, whereas the sparse-weight PSD again provides a clean result.

V. Systems

Figure 15:
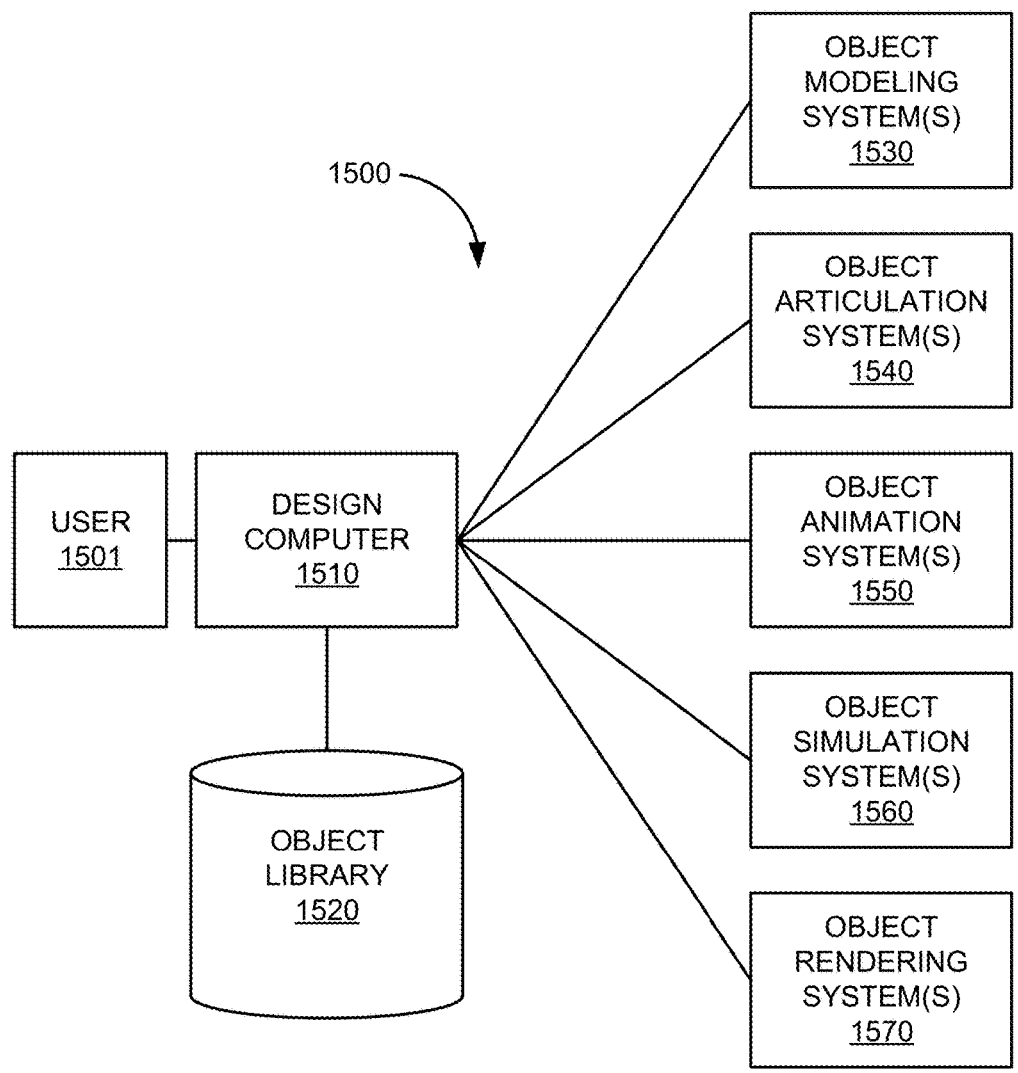
FIG. 15 shows a simplified block diagram of system for creating computer graphics imagery (CGI) and computer-aided animation that may implement or incorporate various embodiments of the invention.

FIG. 15 is a simplified block diagram of system 1500 for creating computer graphics imagery (CGI) and computer-aided animation that may implement or incorporate various embodiments. In this example, system 1500 can include one or more design computers 1510, object library 1520, one or more object modeler systems 1530, one or more object articulation systems 1540, one or more object animation systems 1550, one or more object simulation systems 1560, and one or more object rendering systems 1570. Any of the systems 1530-1570 may be invoked by or used directly by a user of the one or more design computers 1510 and/or automatically invoked by or used by one or more processes associated with the one or more design computers 1510. Any of the elements of system 1500 can include hardware and/or software elements configured for specific functions.

The one or more design computers 1510 can include hardware and software elements configured for designing CGI and assisting with computer-aided animation. Each of the one or more design computers 1510 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 1510 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 1510 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 1510 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1510 acting as an animator may employ one or more systems or tools to specify motion and position of one or more objects over time to produce an animation.

Object library 1520 can include elements configured for storing and accessing information related to objects used by the one or more design computers 1510 during the various stages of a production process to produce CGI and animation. Some examples of object library 1520 can include a file, a database, or other storage devices and mechanisms. Object library 1520 may be locally accessible to the one or more design computers 1510 or hosted by one or more external computer systems.

Some examples of information stored in object library 1520 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1530 can include hardware and/or software elements configured for modeling one or more objects. Modeling can include the creating, sculpting, and editing of an object. In various embodiments, the one or more object modeling systems 1530 may be configured to generated a model to include a description of the shape of an object. The one or more object modeling systems 1530 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1530 may further generate model data (e.g., 2D and 3D model data) for use by other elements of system 1500 or that can be stored in object library 1520. The one or more object modeling systems 1530 may be configured to allow a user to associate additional information, metadata, color, lighting, rigging, controls, or the like, with all or a portion of the generated model data.

The one or more object articulation systems 1540 can include hardware and/or software elements configured to articulating one or more computer-generated objects. Articulation can include the building or creation of rigs, the rigging of an object, and the editing of rigging. In various embodiments, the one or more articulation systems 1540 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1540 may further generate articulation data (e.g., data associated with controls or animations variables) for use by other elements of system 1500 or that can be stored in object library 1520. The one or more object articulation systems 1540 may be configured to allow a user to associate additional information, metadata, color, lighting, rigging, controls, or the like, with all or a portion of the generated articulation data.

The one or more object animation systems 1550 can include hardware and/or software elements configured for animating one or more computer-generated objects. Animation can include the specification of motion and position of an object over time. The one or more object animation systems 1550 may be invoked by or used directly by a user of the one or more design computers 1510 and/or automatically invoked by or used by one or more processes associated with the one or more design computers 1510.

In various embodiments, the one or more animation systems 1550 may be configured to enable users to manipulate controls or animation variables or utilized character rigging to specify one or more key frames of animation sequence. The one or more animation systems 1550 generate intermediary frames based on the one or more key frames. In some embodiments, the one or more animation systems 1550 may be configured to enable users to specify animation cues, paths, or the like according to one or more predefined sequences. The one or more animation systems 1550 generate frames of the animation based on the animation cues or paths. In further embodiments, the one or more animation systems 1550 may be configured to enable users to define animations using one or more animation languages, morphs, deformations, or the like.

The one or more object animations systems 1550 may further generate animation data (e.g., inputs associated with controls or animations variables) for use by other elements of system 1500 or that can be stored in object library 1520. The one or more object animations systems 1550 may be configured to allow a user to associate additional information, metadata, color, lighting, rigging, controls, or the like, with all or a portion of the generated animation data.

The one or more object simulation systems 1560 can include hardware and/or software elements configured for simulating one or more computer-generated objects. Simulation can include determining motion and position of an object over time in response to one or more simulated forces or conditions. The one or more object simulation systems 1560 may be invoked by or used directly by a user of the one or more design computers 1510 and/or automatically invoked by or used by one or more processes associated with the one or more design computers 1510.

In various embodiments, the one or more object simulation systems 1560 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1560 may be used to simulate the behavior of objects, such as hair, fur, and cloth, in response to a physics model and/or animation of one or more characters and objects within a computer-generated scene.

The one or more object simulation systems 1560 may further generate simulation data (e.g., motion and position of an object over time) for use by other elements of system 100 or that can be stored in object library 1520. The generated simulation data may be combined with or used in addition to animation data generated by the one or more object animation systems 150. The one or more object simulation systems 1560 may be configured to allow a user to associate additional information, metadata, color, lighting, rigging, controls, or the like, with all or a portion of the generated simulation data.

The one or more object rendering systems 1570 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1570 may be invoked by or used directly by a user of the one or more design computers 1510 and/or automatically invoked by or used by one or more processes associated with the one or more design computers 1510. One example of a software program embodied as the one or more object rendering systems 1570 can include PhotoRealistic RenderMan, or PRMan, produced by Pixar Animations Studios of Emeryville, Calif.

In various embodiments, the one or more object rendering systems 1570 can be configured to render one or more objects to produce one or more computer-generated images or a set of images over time that provide an animation. The one or more object rendering systems 1570 may generate digital images or raster graphics images.

In various embodiments, a rendered image can be understood in terms of a number of visible features. Some examples of visible features that may be considered by the one or more object rendering systems 1570 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1570 may further render images (e.g., motion and position of an object over time) for use by other elements of system 1500 or that can be stored in object library 1520. The one or more object rendering systems 1570 may be configured to allow a user to associate additional information or metadata with all or a portion of the rendered image.

Figure 16:
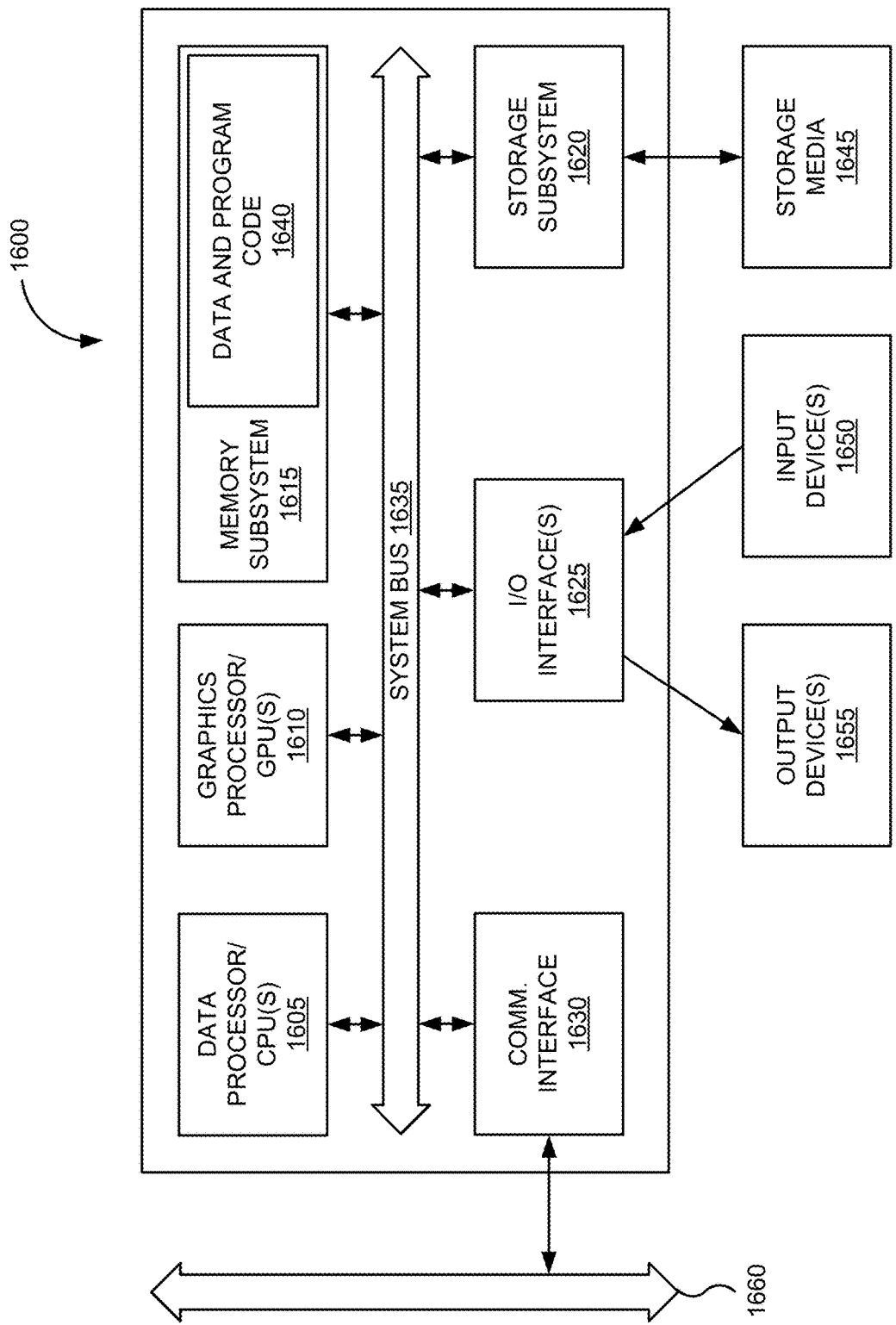
FIG. 16 shows a block diagram of a computer system according to some embodiments of the invention.

FIG. 16 is a block diagram of computer system 1600. FIG. 16 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1600 and any of its components or subsystems can include hardware and/or software elements configured for performing methods described herein.

Computer system 1600 may include familiar computer components, such as one or more one or more data processors or central processing units (CPUs) 1605, one or more graphics processors or graphical processing units (GPUs) 1610, memory subsystem 1615, storage subsystem 1620, one or more input/output (I/O) interfaces 1625, communications interface 1630, or the like. Computer system 1600 can include system bus 1635 interconnecting the above components and providing functionality, such connectivity and inter-device communication.

The one or more data processors or central processing units (CPUs) 1605 can execute logic or program code or for providing application-specific functionality. Some examples of CPU(s) 1605 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1610 can execute logic or program code associated with graphics or for providing graphics-specific functionality. GPUs 1610 may include any conventional graphics processing unit, such as those provided by conventional video cards. In various embodiments, GPUs 1610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1610 may include any number of registers, logic units, arithmetic units, caches, memory interfaces, or the like.

Memory subsystem 1615 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1615 can include data and program code 1640.

Storage subsystem 1620 can also store information using machine-readable articles, information storage devices, or computer-readable storage media. Storage subsystem 1620 may store information using storage media 1645. Some examples of storage media 1645 used by storage subsystem 1620 can include floppy disks, hard disks, optical storage media such as CD-ROMS, DVDs and bar codes, removable storage devices, networked storage devices, or the like. In some embodiments, all or part of data and program code 1640 may be stored using storage subsystem 1620.

The one or more input/output (I/O) interfaces 1625 can perform I/O operations. One or more input devices 1650 and/or one or more output devices 1655 may be communicatively coupled to the one or more I/O interfaces 1625. The one or more input devices 1650 can receive information from one or more sources for computer system 1600. Some examples of the one or more input devices 1650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1650 may allow a user of computer system 1600 to interact with one or more non-graphical or graphical user interfaces to enter a comment, select objects, icons, text, user interface widgets, or other user interface elements that appear on a monitor/display device via a command, a click of a button, or the like.

The one or more output devices 1655 can output information to one or more destinations for computer system 1600. Some examples of the one or more output devices 1655 can include a printer, a fax, a feedback device for a mouse or joystick, external storage systems, a monitor or other display device, a communications interface appropriately configured as a transceiver, or the like. The one or more output devices 1655 may allow a user of computer system 1600 to view objects, icons, text, user interface widgets, or other user interface elements. A display device or monitor may be used with computer system 1600 and can include hardware and/or software elements configured for displaying information.

Communications interface 1630 can perform communications operations, including sending and receiving data. Some examples of communications interface 1630 may include a network communications interface (e.g. Ethernet, Wi-Fi, etc.). For example, communications interface 1630 may be coupled to communications network/external bus 1660, such as a computer network, a USB hub, or the like. A computer system can include a plurality of the same components or subsystems, e.g., connected together by communications interface 1630 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1600 may also include one or more applications (e.g., software components or functions) to be executed by a processor to execute, perform, or otherwise implement techniques disclosed herein. These applications may be embodied as data and program code 1640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1615 and/or storage subsystem 1620.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps, blocks, or lines. Thus, embodiments can be directed to computer systems configured to perform the steps, blocks, or lines of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments. However, other embodiments may be directed to specific embodiments relating to each individual aspect, or specific combinations of these individual aspects.

The above description of example embodiments has been presented for the purposes of illustration and description. It is not intended to be exhaustive or to limit the invention to the precise form described, and many modifications and variations are possible in light of the teaching above. The embodiments were chosen and described in order to best explain the principles and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for deforming an object based on training poses of the object, the method comprising:
   identifying a plurality of animation variables for the object, the animation variables spanning a pose space;
   receiving a plurality of training poses of the object, each training pose corresponding to specific values for the animation variables, each training pose having a shape of the object corresponding to the specific values for the animation variables;
   determining a plurality of clusters, wherein each cluster includes one or more training poses in the pose space, wherein at least one cluster of the plurality of clusters includes a plurality of training poses in the pose space, and wherein each training pose is within one cluster;
   receiving a new pose corresponding to new values for the animation variables, the new pose not being a training pose in a cluster of the plurality of clusters;
   for each of the plurality of clusters:
      calculating a bid point for the cluster based on a location of the new pose in the pose space relative to a location of the cluster in the pose space;
      calculating a contribution of each training pose within the cluster;
      determining a cluster-fitted shape based on one or more training poses of the cluster and their corresponding contributions; and
   determining a weight for each cluster-fitted shape; and
   calculating a weighted combination of each of the cluster-fitted shapes multiplied by the corresponding weight to obtain a new shape of the object corresponding to the new pose, the new shape configured for display on a display of a computer system that determined the new shape.

2. The method of claim 1, further comprising:
   displaying the new shape of the object corresponding to the new pose.

3. The method of claim 1, wherein the new pose is a first new pose and the new shape is a first new shape, and wherein the method further comprises:
   receiving a second new pose of the object; and
   determining a second new shape corresponding to the second new pose, wherein the first new pose is used as a training pose, and wherein the first new shape is used as a corresponding training shape.

4. The method of claim 1, wherein calculating a bid point for a cluster comprises:
   determining a convex hull of the training poses within the cluster, wherein the convex hull is a smallest convex set comprising the training poses within the cluster; and
   projecting the new pose onto the convex hull, wherein the result of the projection is the bid point.

5. The method of claim 1, wherein a first training pose and a second training pose are in the same cluster if and only if:
   they share a same number of nonzero animation variable values, and
   each nonzero animation variable value of the first training pose has the same sign as the corresponding animation variable value in the second training pose.

6. The method of claim 5, wherein the one or more of the plurality of clusters for which a cluster-fitted shape is determined only includes clusters for which the animation variable values are either zero or the same sign as those of the new pose.

7. The method of claim 1, wherein the contribution of a training pose within a cluster to the cluster-fitted shape depends on a distance in pose space between the specific values for the animation variables corresponding to the training pose and the bid point.

8. The method of claim 7, wherein the contribution of each training pose within a cluster to the cluster-fitted shape is calculated using a linear radial basis function, and wherein the center of the radial basis function is the bid point.

9. The method of claim 1, wherein determining the weight for each cluster-fitted shape comprises:
   determining a plurality of basis vectors, wherein each basis vector is a vector from the origin of the pose space to a bid point of a cluster;
   normalizing the plurality of basis vectors to a fixed length to obtain a plurality of normalized basis vectors; and
   calculating a linear combination of the normalized basis vectors toward the new pose, wherein a coefficient for a basis vector in the linear combination is the weight of the corresponding cluster-fitted shape.

10. The method of claim 9, wherein the sum of the coefficients in the linear combination is minimized.

11. A computer product comprising a non-transitory computer readable medium storing a plurality of instructions that when executed control a computer system to deform an object based on training poses of the object, the instructions comprising:
   identifying a plurality of animation variables for the object, the animation variables spanning a pose space;
   receiving a plurality of training poses of the object, each training pose corresponding to specific values for the animation variables, each training pose having a shape of the object corresponding to the specific values for the animation variables;

determining a plurality of clusters, wherein each cluster includes one or more training poses in the pose space, wherein at least one cluster of the plurality of clusters includes a plurality of training poses in the pose space, and wherein each training pose is within one cluster;

receiving a new pose corresponding to new values for the animation variables, the new pose not being a training pose in a cluster of the plurality of clusters;

for each of the plurality of clusters:
  calculating a bid point for the cluster based on a location of the new pose in the pose space relative to a location of the cluster in the pose space;
  calculating a contribution of each training pose within the cluster;
  determining a cluster-fitted shape based on one or more training poses of the cluster and their corresponding contributions; and
  determining a weight for each cluster-fitted shape; and
  calculating a weighted combination of each of the cluster-fitted shapes multiplied by the corresponding weight to obtain a new shape of the object corresponding to the new pose, the new shape configured for display on a display of a computer system that determined the new shape.

12. The computer product of claim 11, wherein calculating a bid point for a cluster comprises:
  determining a convex hull of the training poses within the cluster, wherein the convex hull is the smallest convex set comprising the training poses within the cluster; and
  projecting the new pose onto the convex hull, wherein the result of the projection is the bid point.

13. The computer product of claim 11, wherein a first training pose and a second training pose are in the same cluster if and only if:
  they share a same number of nonzero animation variable values, and
  each nonzero animation variable value of the first training pose has the same sign as the corresponding animation variable value in the second training pose.

14. The computer product of claim 13, wherein the one or more of the plurality of clusters for which a cluster-fitted shape is determined only includes clusters for which the animation variable values are either zero or the same sign as those of the new pose.

15. The computer product of claim 11, wherein the contribution of a training pose within a cluster to the cluster-fitted shape depends on a distance in pose space between the specific values for the animation variables corresponding to the training pose and the bid point.

16. The computer product of claim 15, wherein the contribution of each training pose within a cluster to the cluster-fitted shape is calculated using a linear radial basis function, and wherein the center of the radial basis function is the bid point.

17. The computer product of claim 11, wherein determining the weight for each cluster-fitted shape comprises:

determining a plurality of basis vectors, wherein each basis vector is a vector from the origin of the pose space to a bid point of a cluster;
normalizing the plurality of basis vectors to a fixed length to obtain a plurality of normalized basis vectors; and
calculating a linear combination of the normalized basis vectors toward the new pose, wherein a coefficient for a basis vector in the linear combination is the weight of the corresponding cluster-fitted shape.

18. The computer product of claim 17, wherein the sum of the coefficients in the linear combination is minimized.

19. A computer comprising:
a processor; and
a computer product comprising a non-transitory computer readable medium storing a plurality of instructions that when executed control the computer to animate an object based on training poses of the object, the instructions comprising:
  identifying a plurality of animation variables for the object, the animation variables spanning a pose space;
  receiving a plurality of training poses of the object, each training pose corresponding to specific values for the animation variables, each training pose having a shape of the object corresponding to the specific values for the animation variables;
  determining a plurality of clusters, wherein each cluster includes one or more training poses in the pose space, wherein at least one cluster of the plurality of clusters includes a plurality of training poses in the pose space, and wherein each training pose is within one cluster;
  receiving a new pose corresponding to new values for the animation variables, the new pose not being a training pose in a cluster of the plurality of clusters;
  for each of the plurality of clusters:
    calculating a bid point for the cluster based a location of the new pose in the pose space relative to a location of the cluster in the pose space;
    calculating a contribution of each training pose within the cluster;
    determining a cluster-fitted shape based on one or more training poses of the cluster and their corresponding contributions; and
  determining a weight for each cluster-fitted shape; and
  calculating a weighted combination of each of the cluster-fitted shapes multiplied by the corresponding weight to obtain a new shape of the object corresponding to the new pose, the new shape configured for display on a display of a computer system that determined the new shape.

20. The computer of claim 19, wherein calculating a bid point for a cluster comprises:
  determining a convex hull of the training poses within the cluster, wherein the convex hull is a smallest convex set comprising the training poses within the cluster; and
  projecting the new pose onto the convex hull, wherein the result of the projection is the bid point.

\* \* \* \* \*